United States Patent [19]
Ohyama

[11] Patent Number: 5,621,715
[45] Date of Patent: Apr. 15, 1997

[54] OPTICAL INTEGRATED CIRCUIT

[75] Inventor: Minoru Ohyama, Sagamihara, Japan

[73] Assignee: Victor Company of Japan, Ltd., Yokohama, Japan

[21] Appl. No.: 424,695

[22] Filed: Apr. 19, 1995

[30] Foreign Application Priority Data

Apr. 19, 1994  [JP]  Japan .................... 6-104732

[51] Int. Cl.⁶ .................................... G11B 7/135
[52] U.S. Cl. .................. 369/112; 369/103; 369/107; 369/122; 369/44.23; 385/28; 385/37
[58] Field of Search ................. 385/37, 8, 14, 385/16, 29, 28; 369/112, 44.23, 116, 103, 107, 122; 372/50, 102

[56] References Cited

U.S. PATENT DOCUMENTS

| | | | |
|---|---|---|---|
| 4,918,679 | 4/1990 | Opheji et al. ............... | 369/112 |
| 5,082,339 | 1/1992 | Linnebach ................... | 385/37 |
| 5,446,719 | 8/1995 | Yoshida et al. .............. | 369/116 |
| 5,453,961 | 9/1995 | Brazas ........................ | 369/112 |
| 5,509,094 | 4/1996 | Minami et al. ............... | 385/29 |

FOREIGN PATENT DOCUMENTS

| | | |
|---|---|---|
| 63-261557 | 10/1988 | Japan . |
| 1224933 | 9/1989 | Japan . |
| 3192542 | 8/1991 | Japan . |
| 495252 | 3/1992 | Japan . |
| 4149830 | 5/1992 | Japan . |
| 4289531 | 10/1992 | Japan . |
| 547030 | 2/1993 | Japan . |
| 5151606 | 6/1993 | Japan . |
| 5135400 | 6/1993 | Japan . |

*Primary Examiner*—Georgia Y. Epps
*Assistant Examiner*—Kim-Kwok Chu
*Attorney, Agent, or Firm*—Lowe, Price, LeBlanc & Becker

[57] ABSTRACT

An optical integrated circuit includes a substrate and a thin film formed on the substrate. A waveguide is formed by the thin film. A grating coupler includes a plurality of coupling regions for introducing an incident light beam into the waveguide, and for separating the incident light beam into output light beams propagated in the waveguide in different directions respectively. The output light beams are in a same waveguide mode and have polarization directions perpendicular to each other respectively. Photodetectors are exposed to the output light beams propagated in the waveguide for detecting the output light beams respectively.

19 Claims, 24 Drawing Sheets

OPTICAL INTEGRATED CIRCUIT

BACKGROUND OF THE INVENTION

This invention relates to an optical integrated circuit usable in a reproducing device or an optical measurement device for an optical information recording medium such as an optical disk or a magneto-optical disk.

Some optical integrated circuits have a combination of a photodetector, a light condensing element (a focusing element), and a mirror on an optical waveguide. It is known to use such an optical integrated circuit in an optical pickup device for an optical disk or a magneto-optical disk.

Prior-art optical integrated circuits tend to be low in yield. The prior-art optical integrated circuits are generally unsuited to mass production. The prior-art optical integrated circuits tend to be large, heavy, and expensive.

SUMMARY OF THE INVENTION

It is an object of this invention to provide an improved optical integrated circuit.

It is another object of this invention to provide an improved optical pickup device.

A first aspect of this invention provides an optical integrated circuit comprising a substrate; a thin film formed on the substrate; a waveguide formed by the thin film; a grating coupler including a plurality of coupling regions for introducing an incident light beam into the waveguide, and for separating the incident light beam into output light beams propagated in the waveguide in different directions respectively, wherein the output light beams are in a same waveguide mode and have polarization directions perpendicular to each other respectively; and photodetectors exposed to the output light beams propagated in the waveguide for detecting the output light beams respectively.

The optical integrated circuit may further comprise at least one optical element disposed in each of optical paths between the coupling regions of the grating coupler and the photodetectors.

It is preferable that the photodetectors are integrated on the substrate.

The optical integrated circuit may further comprise a processing section for processing output signals of the photodetectors into a signal representing rotation of polarization of the incident light beam.

It is preferable that the processing section is integrated on the substrate.

The optical integrated circuit may further comprise a buffer layer formed on the grating coupler, and a semitransparent mirror layer formed on the buffer layer.

A second aspect of this invention provides an optical integrated circuit located between a light source and a recording medium along an optical path, the optical integrated circuit comprising a substrate; a thin film formed on the substrate; a waveguide formed by the thin film; a semitransparent reflection-type grating for shaping a light beam from the light source into a forward light beam, for directing the forward light beam toward the recording medium, and for transmitting a return light beam coming from the recording medium; a grating coupler including a plurality of coupling regions exposed to the return light beam which has been transmitted by the semitransparent reflection-type grating for introducing the return light beam into the waveguide, and for separating the return light beam into output light beams propagated in the waveguide in different directions respectively; and photodetectors exposed to the output light beams propagated in the waveguide for detecting the output light beams respectively.

It is preferable that the output light beams are in a same waveguide mode and have polarization directions perpendicular to each other respectively.

It is preferable that the photodetectors are integrated on the substrate.

The optical integrated circuit may further comprise a processing section for processing output signals of the photodetectors into a signal representing rotation of polarization of the return light beam, the processing section being integrated on the substrate.

A third aspect of this invention provides an optical integrated circuit located between a light source and a recording medium along an optical path, the optical integrated circuit comprising a substrate; a thin film formed on the substrate; a waveguide formed by the thin film; a semitransparent reflection-type hologram for shaping and wavefront-converting a light beam from the light source into a forward light beam, for directing the forward light beam toward the recording medium, and for transmitting a return light beam coming from the recording medium; a grating coupler including a plurality of coupling regions exposed to the return light beam which has been transmitted by the semitransparent reflection-type hologram for introducing the return light beam into the waveguide, and for separating the return light beam into output light beams propagated in the waveguide in different directions respectively; and photodetectors exposed to the output light beams propagated in the waveguide for detecting the output light beams respectively.

It is preferable that the output light beams are in a same waveguide mode and have polarization directions perpendicular to each other respectively.

It is preferable that the photodetectors are integrated on the substrate.

The optical integrated circuit may further comprise a processing section for processing output signals of the photodetectors into a signal representing rotation of polarization of the return light beam, the processing section being integrated on the substrate.

A fourth aspect of this invention provides an optical pickup device for a recording medium which comprises a) a light source emitting a light beam; b) an optical integrated circuit deriving a forward light beam from the light beam emitted from the light source, the optical integrated circuit being exposed to a return light beam coming from the recording medium; and c) means for focusing the forward light beam on the recording medium; wherein the light source, the optical integrated circuit, and the focusing means are mechanically combined into a single unit; the optical integrated circuit comprising b1) a substrate; b2) a thin film formed on the substrate; b3) a waveguide formed by the thin film; b4) a semitransparent reflection-type hologram for shaping and wavefront-converting the light beam from the light source into the forward light beam, for directing the forward light beam toward the recording medium, and for transmitting the return light beam coming from the recording medium; b5) a grating coupler including a plurality of coupling regions exposed to the return light beam which has been transmitted by the semitransparent reflection-type hologram for introducing the return light beam into the waveguide, and for separating the return light beam into output light beams propagated in the waveguide in different directions respectively; and b6) photodetectors exposed to the output light beams propagated in the waveguide for detecting the output light beams respectively.

It is preferable that the output light beams are in a same waveguide mode and have polarization directions perpendicular to each other respectively.

It is preferable that the photodetectors are integrated on the substrate.

It is preferable that the optical integrated circuit further comprises a processing section for processing output signals of the photodetectors into a signal representing rotation of polarization of the return light beam, the processing section being integrated on the substrate, It is preferable that the focusing means is incorporated into the optical integrated circuit.

DESCRIPTION OF THE PRIOR ART

Figure 1:
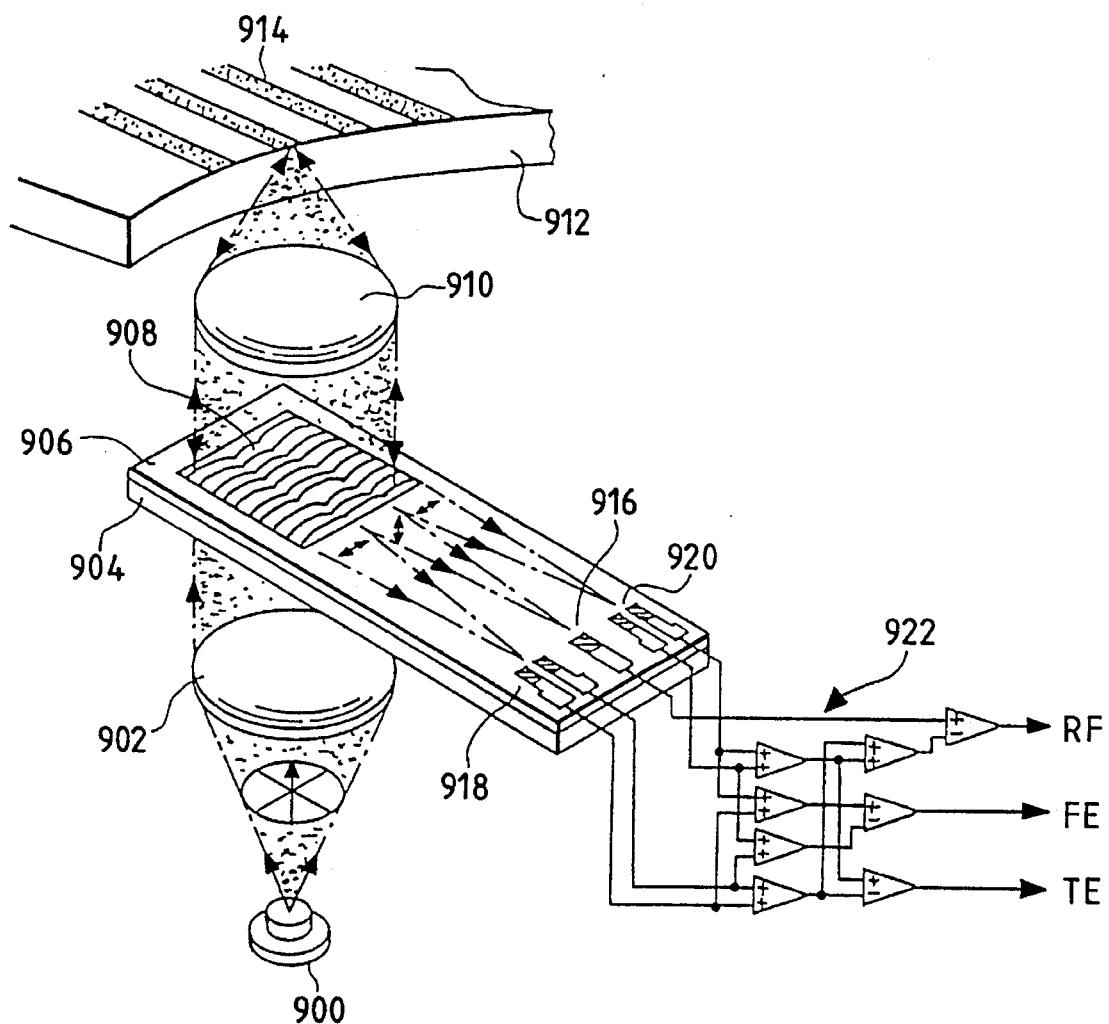
FIG. 1 is a diagram of a prior-art optical pickup device.

FIG. 1 shows a first prior-art optical pickup device for a magneto-optical disk in which an optical system for detection has an integrated structure on an optical waveguide.

With reference to FIG. 1, the first prior-art optical pickup device includes a semiconductor laser 900 emitting a laser light beam polarized in a given direction. The laser light beam emitted from the semiconductor laser 900 is incident to a collimating lens 902, being made into a collimated light beam (a parallel light beam) thereby. The collimated light beam passes through a focusing grating coupler 908 formed in an optical waveguide 906 on a substrate 904. The focusing grating coupler 908 is designed to provide three focal points. After passing through the focusing grating coupler 908, the collimated light beam is incident to an objective lens 910 and is focused thereby on a magnetic recording portion 914 of a magneto-optical disk 912.

The light beam is reflected by the magnetic recording portion 914. The light beam undergoes rotation of a polarization plane due to the Kerr effect when being applied to and reflected by the magnetic recording portion 914. The reflection-resultant light beam travels through the objective lens 910, and then enters the focusing grating coupler 908. The reflection-resultant light beam is guided or introduced into the optical waveguide 906 by the focusing grating coupler 908.

The focusing grating coupler 908 has three sections (regions) corresponding to sub focusing grating couplers respectively. The central section of the focusing grating coupler 908 is designed to excite and guide light in a TM mode. The other sections (the side sections) of the focusing grating coupler 908 are designed to excite and guide light in a TE mode. Thus, the focusing grating coupler 908 serves as perpendicular polarizers using mode dispersion characteristics of the optical waveguide 906.

A TM-mode light beam, which corresponds to a component of the light beam Incident to the focusing grating coupler 908, is propagated to a photodiode 916 along the optical waveguide 906. The TM-mode light beam is converted by the photodiode 916 into a corresponding electric signal. TE-mode light beams, which correspond to components of the light beam incident to the focusing grating coupler 908, are propagated to photodiodes 918 and 920 along the optical waveguide 906 respectively. The TE-mode light beams are converted by the photodiodes 918 and 920 into corresponding electric signals.

The photodiodes 916, 918, and 920 output the electric signals to a processing section 922. Signals RF, FE, and TE are generated by the processing section 922 in response to the output signals of the photodiodes 916, 918, and 920. The signal RF represents information recorded on the magnetic recording portion 914 of the magneto-optical disk 912. The signal FE agrees with a focusing error signal. The signal TE agrees with a tracking error signal.

In the first prior-art pickup device of FIG. 1, the focusing grating coupler 908 and the photodetectors 916, 918, and 920 are integrated on the optical waveguide 906.

Japanese published unexamined patent application 63-261557 discloses a second prior-art optical pickup device for a magneto-optical disk in which a focusing grating coupler is formed on an optical waveguide of a double-path structure.

Figure 2:
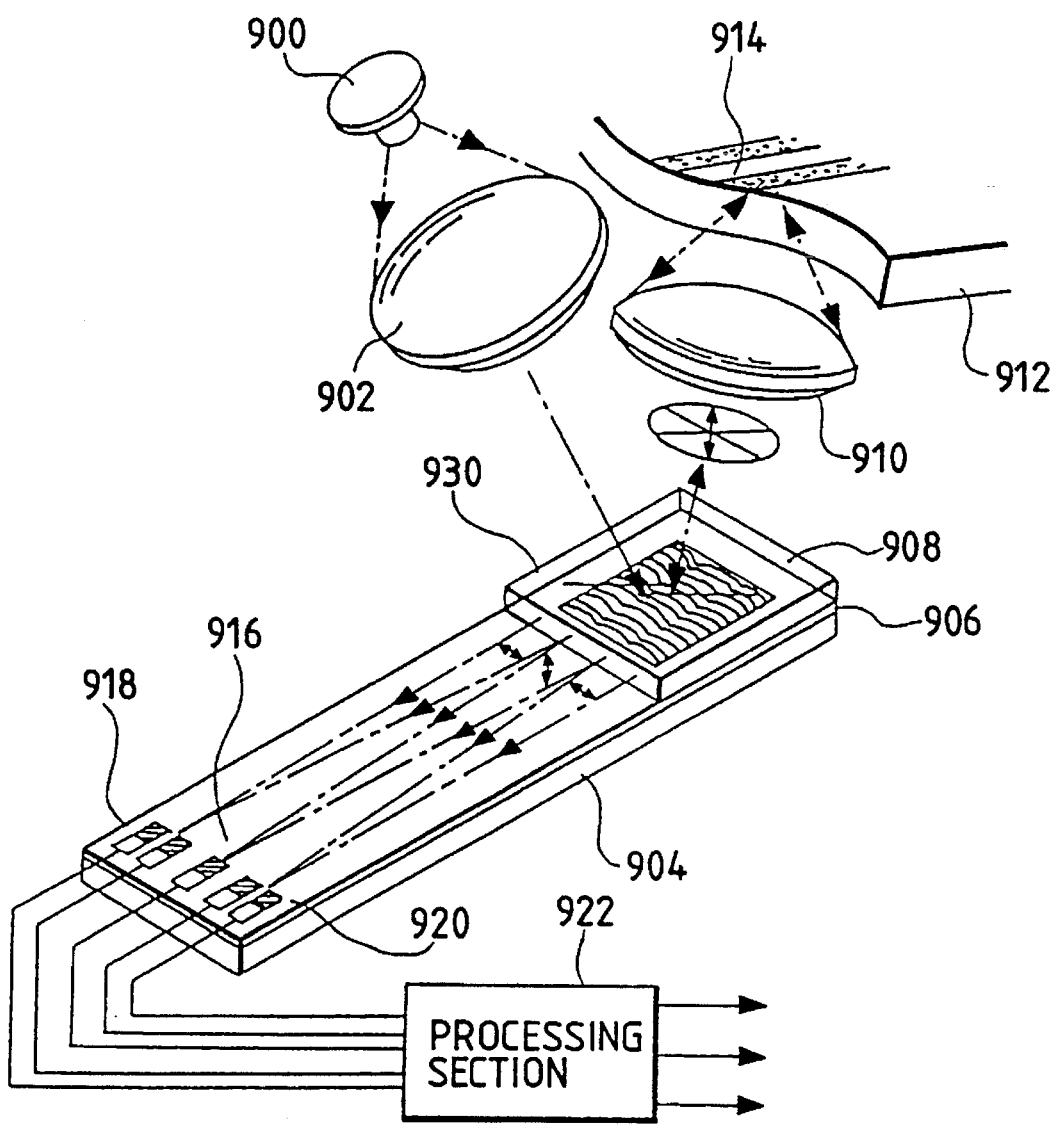
FIG. 2 is a diagram of a prior-art optical pickup device.

FIG. 2 shows a third prior-art optical pickup device for a magneto-optical disk which is similar to the prior-art optical pickup device of FIG. 1 except for design changes described hereinafter. In the third prior-art optical pickup device of FIG. 2, a substrate 904 uses silicon (Si) to make an optical system for detection and photodiodes into a monolithic integrated structure. In the third prior-art optical pickup device of FIG. 2, a semitransparent mirror 930 is formed on a focusing grating coupler 908. A laser light beam emitted from a semiconductor laser 900 is made into a collimated light beam by a collimating lens 902, and the collimated light beam travels to the semitransparent mirror 930. The collimated light beam is reflected by the semitransparent mirror 930 before being applied to a magneto-optical disk 912 via an objective lens 910.

A fourth prior-art example relates to a magneto-optical signal detector for an optical integrated pickup device in which a laser light beam emitted from a semiconductor laser is collimated into a collimated light beam, and the collimated light beam is reflected by a prism coupler before being applied to a magneto-optical disk. The light beam is reflected by the magneto-optical disk. The reflection-resultant light beam is introduced into an optical waveguide via the prism coupler. The light beam is separated by a taper coupling portion of the prism coupler into a light beam in a TE mode and a light beam in a TM mode.

Japanese published unexamined patent application 4-95252 discloses a fifth prior-art optical pickup device including an optical coupler. In the fifth prior-art optical pickup device, the optical coupler guides a return light beam caused by reflection at a recording medium. The return light beam is reflected by a total reflection mirror before being separated into a light beam in a TE mode and a light beam in a TM mode. The TE-mode light beam and the TM-mode light beam are detected by photosensitive members.

Figure 3:
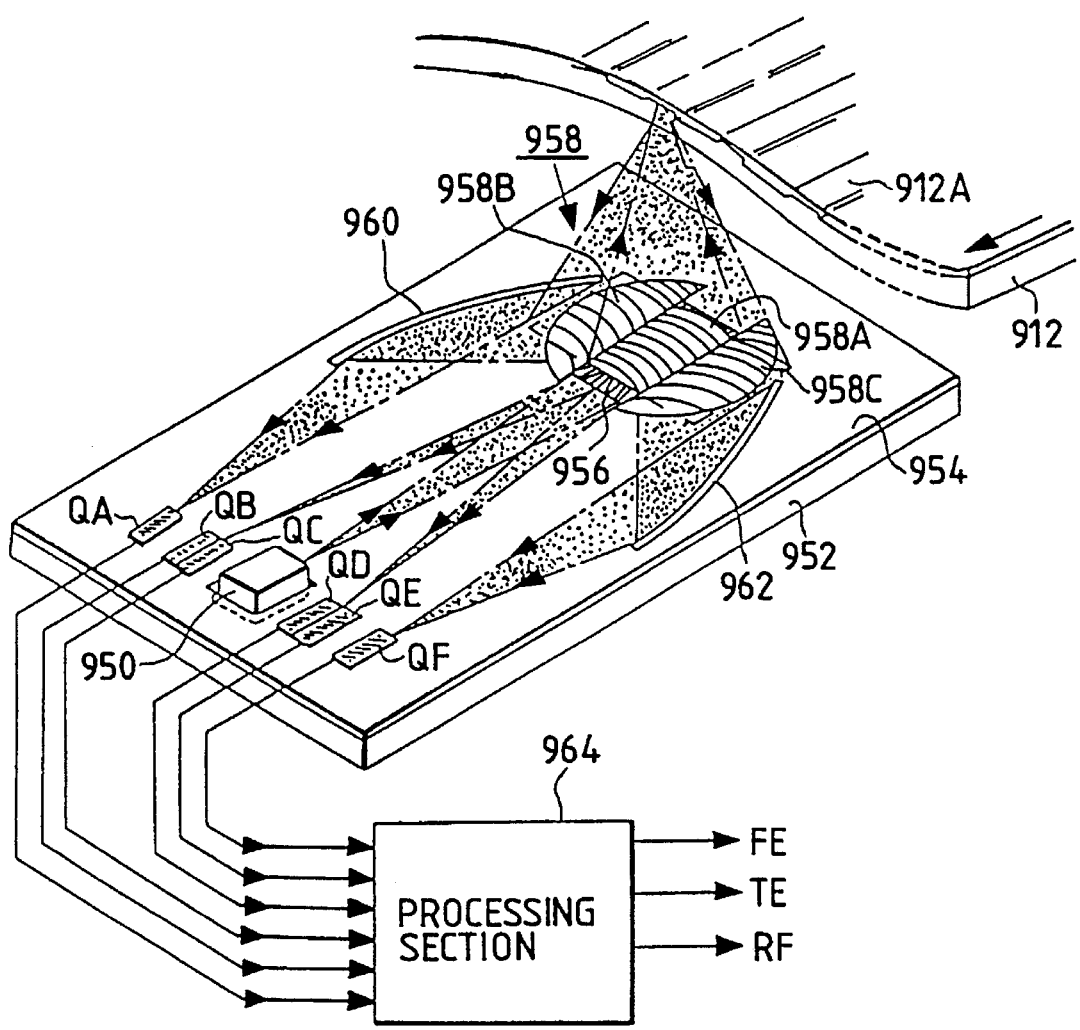
FIG. 3 is a diagram of a prior-art optical pickup device.

FIG. 3 shows a sixth prior-art optical pickup device for a magneto-optical disk which is disclosed in Japanese published unexamined patent application 5-47030. In the sixth prior-art optical pickup device of FIG. 3, an optical waveguide 954 is formed on an Si substrate 952, and a semiconductor laser 950 is provided at a first end of the optical waveguide 954. A grating beam splitter 956 and a focusing grating coupler 958 are formed at a second end of the optical waveguide 954. The focusing grating coupler 958 is designed to provide three focal points.

The focusing grating coupler 958 has a central section (region) 958A and two side sections (regions) 958B and 958C. A laser light beam emitted from the semiconductor laser 950 is incident to the central section 958A via the grating beam splitter 956. The central section 958A separates the laser light beam from the optical waveguide 954, and focuses the laser light beam on a magneto-optical disk 912. A 0th order reflection (diffraction) light beam coming from the magneto-optical disk 912 is introduced by the central section 958A into the optical waveguide 954. A +1st order diffraction light beam and a −1st order diffraction light beam coming from the magneto-optical disk 912 are introduced into the optical waveguide 954 by the side sections 958B and 958C.

Reflection-type waveguide lenses 960 and 962 are formed along the output edges of the side sections 958B and 958C of the focusing grating coupler 958 respectively. The first end of the optical waveguide 954 is provided with photodetectors QB, QC, QD, and QE which can be exposed to light beams outputted from the grating beam splitter 956. In addition, the first end of the optical waveguide 954 is provided with photodetectors QA and QF which can be exposed to light beams coming from the reflection-type waveguide lenses 960 and 962. The photodetectors QA–QF are electrically connected to a processing section 964.

A laser light beam emitted from the semiconductor laser 950 is propagated in the optical waveguide 954 while slightly spreading. The laser light beam passes through the grating beam splitter 956, and then reaches the central section 958A of the focusing grating coupler 958. The laser light beam is separated from the optical waveguide 954, and is focused on the surface of the magneto-optical disk 912 by the central section 958A of the focusing grating coupler 958. The laser light beam propagated in the optical waveguide 954 assumes only a linearly-polarized TE mode or a linearly-polarized TM mode. In the case where a TE-mode laser light beam is used, the laser light beam focused on the magneto-optical disk 912 agrees with a light beam linearly polarized along a direction perpendicular to tracks for tracking control or pre-grooves 912A of the magneto-optical disk 912.

The laser light beam is reflected by the surface of the magneto-optical disk 912. The reflection-resultant light beam agrees with a 0th order reflection (diffraction) light beam which returns along the path of the forward light beam. In addition, the laser light beam is diffracted by the pre-grooves 912 in the magneto-optical disk 912. The diffraction causes a +1st order diffraction light beam and a −1st order diffraction light beam. The light beam undergoes rotation of a polarization plane due to the Kerr effect when being applied to and returned by the magnetic recording portion 914.

The 0th order reflection light beam travels back to the central section 958A of the focusing grating coupler 958, being introduced into the optical waveguide 954 thereby. Then, the 0th order light beam is incident to the grating beam splitter 956. The 0th order light beam undergoes path-direction change by the grating beam splitter 956, and separates into light beams focused on the photodetectors QB, QC, QD, and QE. The photodetectors QB, QC, QD, and QE convert the received light beams into corresponding electric signals, and output the electric signals to the processing section 964.

The +1st order diffraction light beam and the −1st order diffraction light beam are incident to the side sections 958B and 958C of the focusing grating coupler 958 respectively. The side sections 958B and 958C are designed to correspond to polarization directions which are perpendicular to each other and which form angles of +45° and −45° with respect to the central optical axis respectively. The +1st order diffraction light beam and the −1st order diffraction light beam are introduced into the optical waveguide 954 by the side sections 958B and 958C respectively. At this time, the +1st order diffraction light beam and the −1st order diffraction light beam are subjected by the side sections 958B and 958C to intensity changes with opposite phases respectively. Subsequently, the +1st order diffraction light beam and the −1st order diffraction light beam are outputted from the side sections 958B and 958C to the reflection-type waveguide lenses 960 and 962 respectively. The +1st order diffraction light beam and the −1st order diffraction light beam are focused on the photodetectors QA and QB by the reflection-type waveguide lenses 960 and 962 respectively. The photodetectors QA and QB convert the +1st order diffraction light beams into corresponding electric signals, and output the electric signals to the processing section 964.

The processing section 964 generates signals RF, FE, and TE in response to the output signals of the photodetectors QA–QF. The signal RF represents information recorded on the magneto-optical disk 912. The signal FE agrees with a focusing error signal. The signal TE agrees with a tracking error signal. Specifically, the generation of the signals RF, FE, and TE uses calculations expressed as follows.

$$FE = (B+E)-(C+D)$$

$$TE = (A+B+C)-(D+E+F)$$

$$RF = A-F$$

where "A", "B", "C", "D", "E", and "F" denote the output signals of the photodetectors QA, QB, QC, QD, QE, and QF respectively.

Japanese published unexamined patent application 4-149830 discloses a seventh prior-art optical pickup device including a grating coupler. In the seventh prior-art optical pickup device, the length of the grating coupler is greater than the diameter of an incident laser light beam, and the laser light beam is directly reflected at a waveguide surface. The direct reflection enables the laser light beam to be incident to a recording disk.

Japanese published unexamined patent application 3-192542 discloses an eighth prior-art optical pickup device including a prism and a polarization beam splitter formed on a device base. A laser light beam is applied to a recording disk via the prism and the polarization beam splitter.

Japanese published unexamined patent application 4-289531 discloses a ninth prior-art optical pickup device including a prism formed on a device base. The prism is designed to enable an increase in the amount of light applied to a recording disk as well as an increase in the amount of light fed to a photodetective section.

DESCRIPTION OF THE PREFERRED EMBODIMENTS

First Embodiment

Figure 4:
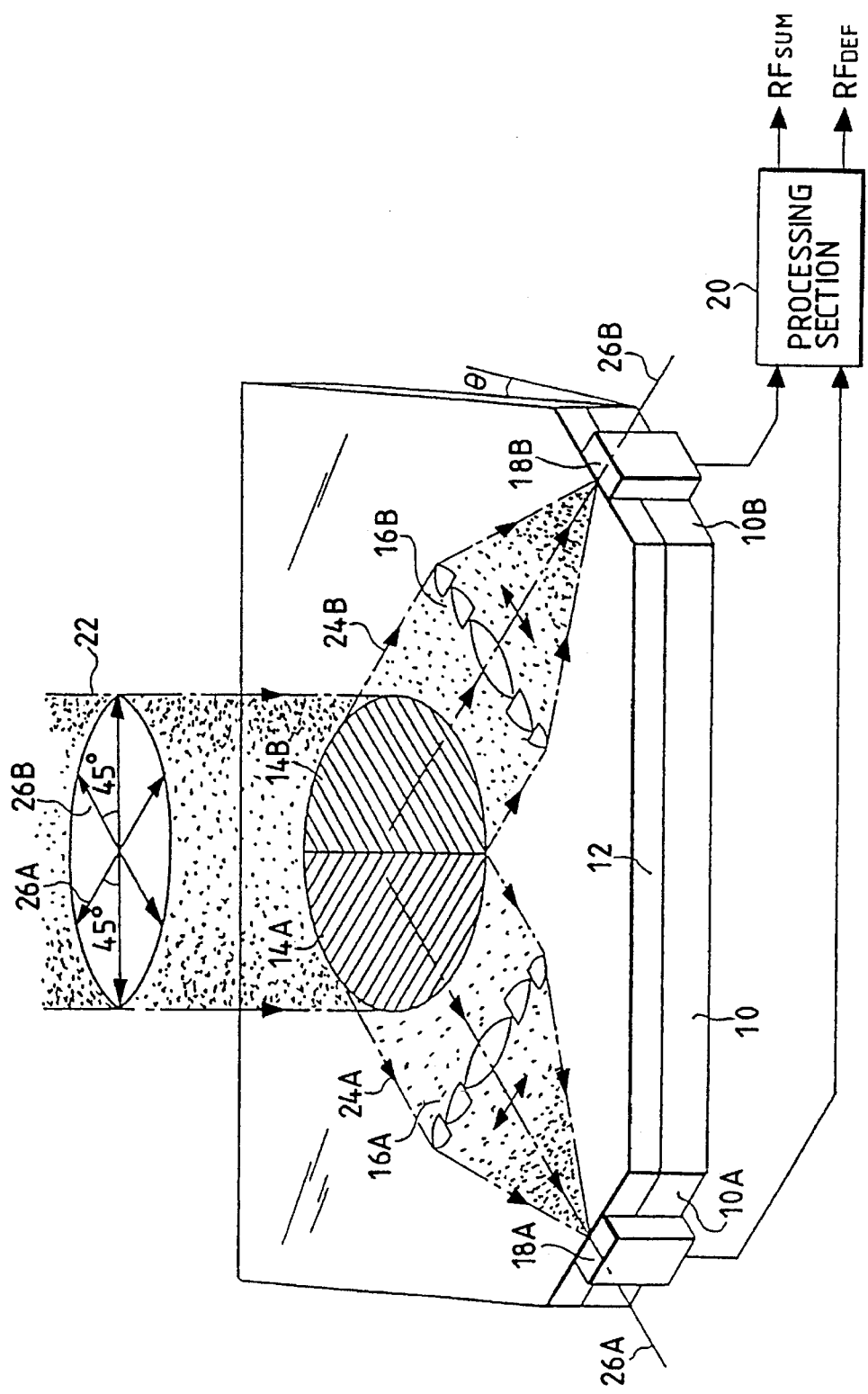
FIG. 4 is a diagram of a portion of an optical pickup device including an optical integrated circuit according to a first embodiment of this invention.
Figure 5:
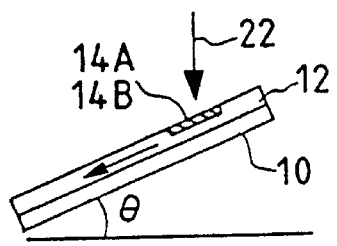
FIG. 5 is a side view of the optical integrated circuit in FIG. 4.
Figure 6:
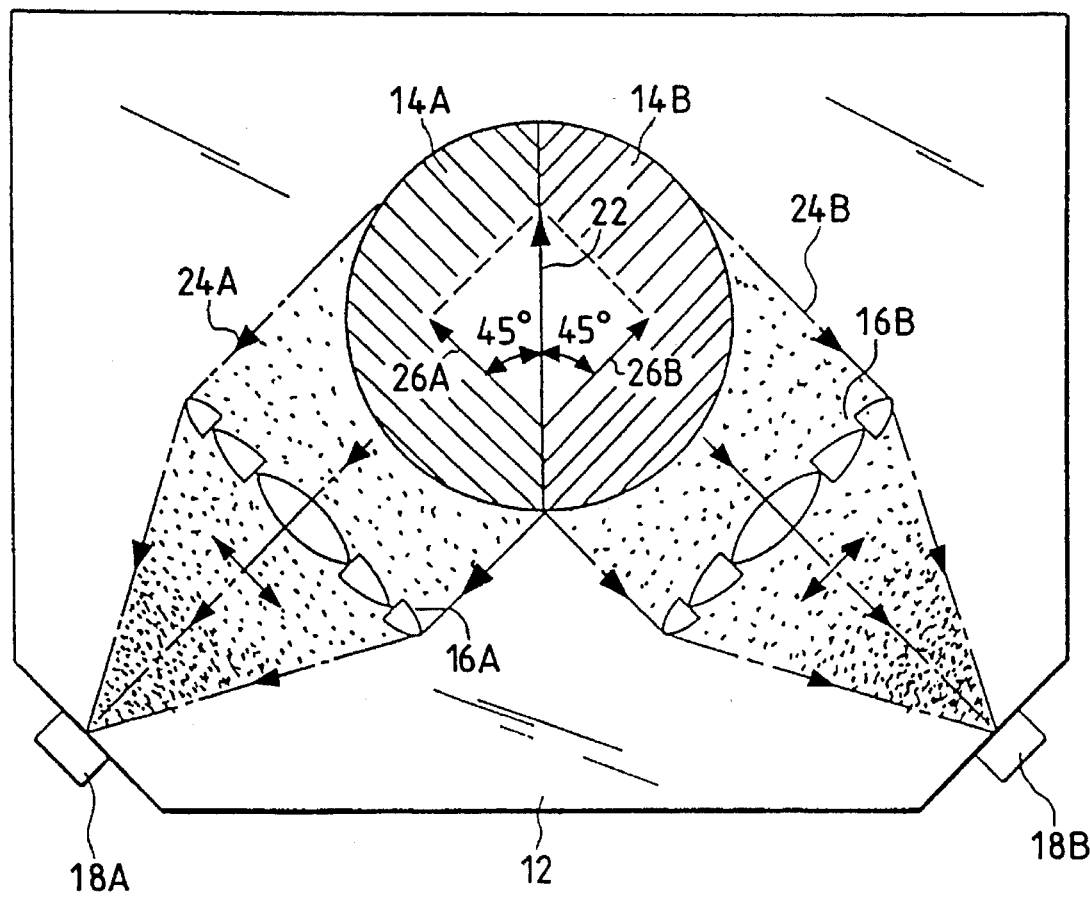
FIG. 6 is a top view of the optical integrated circuit in FIG. 4.

With reference to FIGS. 4, 5 and 6, an optical pickup device includes an optical integrated circuit having a substrate 10 which is formed with a layer 12 providing an optical waveguide. The waveguide layer 12 is composed of a thin film having a thickness comparable to the wavelength of light to be handled.

Grating couplers 14A and 14B are formed on the waveguide layer 12. Waveguide lenses 16A and 16B are formed in optical paths extending from the output sides of the grating couplers 14A and 14B respectively. It is preferable that the waveguide lenses 16A and 16B include Fresnel zone lenses respectively.

The waveguide layer 12, the grating couplers 14A and 14B, and the waveguide lenses 16A and 16B are integrated on the substrate 10. In other words, the substrate 10, the waveguide layer 12, the grating couplers 14A and 14B, and the waveguide lenses 16A and 16B compose the optical integrated circuit.

A photodetector 18A attached to a side surface of the substrate 10 occupies a position corresponding to a focal point provided by the waveguide lens 16A. A photodetector 18B attached to a side surface of the substrate 10 occupies a position corresponding to a focal point provided by the waveguide lens 16B. The photodetectors 18A and 18B are electrically connected to a processing section 20.

Each of the grating couplers 14A and 14B provides a coupling (a conversion) between a collimated light beam (a parallel light beam) propagated outside the waveguide layer 12 and a collimated light beam (a parallel light beam) propagated in the waveguide layer 12. Each of the grating couplers 14A and 14B has an optical pattern composed of parallel lines separated by equal intervals (equal pitches). The optical pattern is formed by, for example, given unevenness or roughness in the grating-coupler surface. Thus, the grating couplers 14A and 14B are of the linear type. As viewed in a plane perpendicular to an optical axis with respect to a light beam 22 incident to the grating couplers 14A and 14B, the optical axes of the waveguide paths from the grating couplers 14A and 14B (that is, the optical axes of the grating couplers 14A and 14B with respect to the light beams in the waveguide layer 12) are approximately perpendicular to each other. In addition, the optical axes of the waveguide paths form angles of about +45° and about −45° with respect to the normal direction of the polarization of the incident light beam 22 respectively.

Hereinafter, a description will be given of a method of making the optical pickup device of FIGS. 4–6, and materials for the parts of the optical pickup device of FIGS. 4–6. The substrate 10 is made of dielectric material. The waveguide layer 12 includes a thin film formed on the substrate 10. The thin film has a refractive index "n" slightly higher than that of the dielectric material for the substrate 10. For example, the substrate 10 uses a Pyrex glass plate having a refractive index of 1.47 while the waveguide layer 12 uses a thin film of Corning #7059 glass having a refractive index "n" of 1.54. The thin film has a thickness of, for example, 0.8 μm. The thin film can be formed on the substrate 10 by an RF sputtering process.

For example, each of the grating couplers 14A and 14B and the waveguide lenses 16A and 16B is made by forming a corresponding Si-N thin film on the waveguide layer 12 in a plasma CVD process, and then shaping the Si-N thin film into a given pattern according to an electron-beam drawing (patterning) process and a dry etching process.

The substrate 10 is formed with light-condensed end (side) surfaces 10A and 10B by a polishing process using very fine abrasive grains. The photodetectors 18A and 18B are bonded to the end surfaces 10A and 10B of the substrate 10 by adhesive providing a high transmittance with respect to used light beams. The polishing process to form the end surfaces 10A and 10B reduces the losses of light beams applied to the photodetectors 18A and 18B via the end surfaces 10A and 10B.

As best shown in FIG. 5, the optical integrated circuit is placed so that the substrate 10 and the waveguide layer 12 will form a given angle θ with respect to a plane perpendicular to the optical axis corresponding to the incident light beam 22 coming from a magneto-optical disk (not shown).

Hereinafter, a description will be given of operation of the optical pickup device of FIGS. 4–6. An approximately-collimated incident light beam 22 is introduced into the waveguide layer 12 via the grating couplers 14A and 14B, being changed and separated into light beams 24A and 24B propagated in the waveguide layer 12 respectively.

As previously described, each of the grating couplers 14A and 14B provides a coupling (a conversion) between a collimated light beam propagated outside the waveguide layer 12 and a collimated light beam propagated in the waveguide layer 12. In addition, the optical axes of the waveguide paths from the grating couplers 14A and 14B (that is, the optical axes of the grating couplers 14A and 14B with respect to the light beams in the waveguide layer 12) form angles of about +45° and about −45° with respect to the normal direction of the polarization of the incident light beam 22 respectively.

Therefore, in the case where only TE-mode light beams are excited in the waveguide layer 12, only components 26A and 26B of the incident light beam 22 which are polarized in directions perpendicular to the optical axes of the waveguide paths from the grating couplers 14A and 14B are selected and extracted as light beams 24A and 24B propagated in the waveguide layer 12 (see FIG. 6).

As a result, the grating couplers 14A and 14B serve as analyzers which are arranged in perpendicular directions respectively and which are related to polarization angles of about ±45° with respect to the normal direction of the polarization of the incident light beam 22. Therefore, the grating couplers 14A and 14B output light beams 24A and 24B polarized in directions perpendicular to each other respectively.

The light beam 24A outputted from the grating coupler 14A agrees with an approximately collimated light beam propagated along the waveguide path in the waveguide layer 12. The approximately collimated light beam 24A passes through the waveguide lens 16A, being focused thereby on the photodetector 18A. The photodetector 18A converts the received light beam 24A into a corresponding electric signal. The photodetector 18A outputs the electric signal to the processing section 20.

The light beam 24B outputted from the grating coupler 14B agrees with an approximately collimated light beam propagated along the waveguide path in the waveguide layer 12. The approximately collimated light beam 24B passes through the waveguide lens 16B, being focused thereby on the photodetector 18B. The photodetector 18B converts the received light beam 24B into a corresponding electric signal. The photodetector 18B outputs the electric signal to the processing section 20.

As the direction of the polarization of the incident light beam 22 rotates due to the Kerr effect which occurs at the magneto-optical disk, the intensities of the light beams 24A and 24B vary with opposite phases respectively. Specifically, one of the intensities of the light beams 24A and 24B increases while the other decreases. Thus, as the direction of the polarization of the incident light beam 22 rotates, the output signals of the photodetectors 18A and 18B vary with opposite phases respectively.

The processing section 20 includes a differential amplifier or a subtracter which generates and outputs a signal $FR_{DEF}$ depending on the difference between the output signals of the photodetectors 18A and 18B. The signal $FR_{DEF}$ represents the rotation of the direction of the polarization of the incident light beam 22. The processing section 20 also includes a summing circuit or an adder which generates and outputs a signal $RF_{SUM}$ depending on the addition of the output signals of the photodetectors 18A and 18B. The signal $RF_{SUM}$ represents the intensity of the incident light beam 22.

As understood from the above description, the optical integrated circuit of FIGS. 4–6 uses guided light beams in the same mode (for example, the TE mode). This fact enables easy designing of the optical integrated circuit in comparison with designing of an optical integrated circuit using guided light beams of at least two different modes. In addition, this fact enables an increased accuracy of the arrangement of the optical integrated circuit as well as an increased efficiency of the detection of the guided light beams.

As shown in FIGS. 4 and 6, the optical pickup device has two light detecting sections which are symmetrical with each other. Specifically, one of the two light detecting sections includes the grating coupler 14A, the waveguide lens 16A, the photodetector 18A, and the left-hand half of the waveguide layer 12. The other of the two light detecting sections includes the grating coupler 14B, the waveguide lens 16B, the photodetector 18B, and the right-hand half of the waveguide layer 12. The symmetrical configuration enables a good balance between the two light detecting sections, and also a good balance between the output electric signals of the two light detecting sections. Under the good balance, common mode noise is adequately removed from the target signal $FR_{DEF}$ through difference-generating operation of the processing section 20. Therefore, it is possible to attain a high SNR (signal-to-noise ratio) and a high CNR (carrier-to-noise ratio) with respect to the target signal $FR_{DEF}$.

The optical pickup device includes an optical system (not shown) for applying a forward laser light beam to the magneto-optical disk. The forward-light optical system is preferably of the bulk type rather than the integrated type. Such a forward-light optical system can provide a high efficiency of the application of the laser light beam to the magneto-optical disk.

It should be noted that the processing section 20 may be incorporated into the optical integrated circuit. The grating couplers 14A and 14B may have another optical pattern. This embodiment can also be applied to an optical pickup device for a phase pit disk such as a CD or one of other recording media.

Second Embodiment

Figure 7:
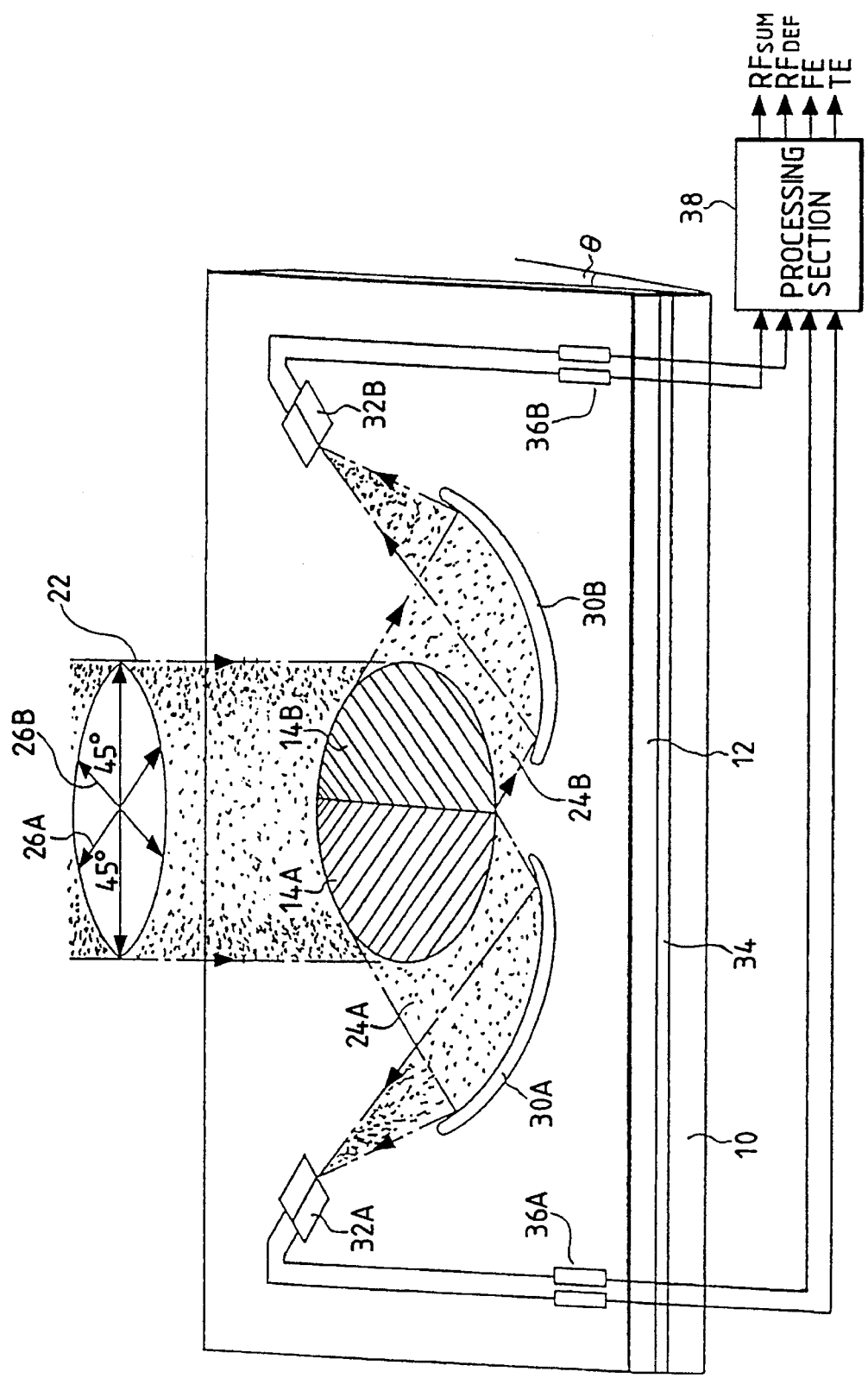
FIG. 7 is a diagram of a portion of an optical pickup device including an optical integrated circuit according to a second embodiment of this invention.

FIG. 7 shows a second embodiment of this invention which is similar to the embodiment of FIGS. 4–6 except for design changes indicated hereinafter. In the embodiment of FIG. 7, waveguide lenses 30A and 30B of the reflection type are formed in optical paths extending from the output sides of grating couplers 14A and 14B respectively. The waveguide lenses 30A and 30B bend optical paths in optical systems respectively. Photodetectors 32A and 32B are provided in optical paths extending from the output sides of the waveguide lenses 30A and 30B respectively. Each of the photodetectors 32A and 32B is divided into two segments exposed to a light beam.

Each of the waveguide lenses 30A and 30B is of a parabolic configuration for focusing a collimated light beam on a point. Each of the waveguide lenses 30A and 30B can be easily designed in a method having the step of tracing light rays in a waveguide plane. A mirror providing the waveguide lens 30A or 30B can be formed by etching a portion of a waveguide layer 12 into a taper shape. To reduce a scattering loss caused by the mirror surface, it is preferable that the angle of the taper shape with respect to the waveguide plane is set to a small angle (for example, 10°) to suppress roughness in the taper surface.

The waveguide layer 12, the grating couplers 14A and 14B, the waveguide lenses 30A and 30B, the photodetectors 32A and 32B are integrated into a monolithic structure on a substrate 10. In other words, the substrate 10, the waveguide layer 12, the grating couplers 14A and 14B, the waveguide lenses 30A and 30B, and the photodetectors 32A and 32B compose an optical integrated circuit. A buffer layer 34 extends between the substrate 10 and the waveguide layer 12.

During the fabrication of the optical integrated circuit in FIG. 7, an $SiO_2$ buffer layer 34 is formed on a substrate 10 of an Si crystal by a surface heating and oxidizing process. The buffer layer 34 has a refractive index "n" of 1.46. A waveguide layer 12 is formed on the buffer layer 34 by a sputtering process. The waveguide layer 12 is made of Corning #7059 glass having a refractive index "n" of 1.54. A film of Si-N is formed on the waveguide layer 12 by a plasma CVD process. The Si-N film is shaped by a dry etching process into given patterns corresponding to the grating couplers 14A and 14B respectively. The Si crystal for the substrate 10 has a conduction type which agrees with the "n" type. Portions of the substrate 10 are doped with p-type impurities (for example, boron) to provide pn junctions forming the photodetectors 32A and 32B.

As previously described, each of the photodetectors 32A and 32B has two divided segments. This arrangement of the photodetectors 32A and 32B enables the generation of a focusing error signal and a tracking error signal in addition to a normal information-representing signal. The photodetectors 32A and 32B are electrically connected to a processing section 38 via terminals 36A and 36B on the substrate 10. The processing section 38 separates from the substrate and the optical integrated circuit.

The embodiment of FIG. 7 operates as follows. An approximately-collimated incident light beam 22 is introduced into the waveguide layer 12 via the grating couplers 14A and 14B, being changed and separated into light beams 24A and 24B propagated in the waveguide layer 12 respectively. The light beams 24A and 24B are in the same mode (for example, the TE mode).

The light beam 24A outputted from the grating coupler 14A meets the waveguide lens 30A, being reflected and focused thereby into a spot on the photodetector 32A. The two segments of the photodetector 32A are exposed to portions of the light spot respectively. The two segments of the photodetector 32A convert the light spot portions into corresponding electric signals respectively. The two segments of the photodetector 32A output the electric signals to the processing section 38 via the terminal 36A.

The light beam 24B outputted from the grating coupler 14B meets the waveguide lens 30B, being reflected and focused thereby into a spot on the photodetector 32B. The two segments of the photodetector 32B are exposed to portions of the light spot respectively. The two segments of the photodetector 32B convert the light spot portions into corresponding electric signals respectively. The two segments of the photodetector 32B output the electric signals to the processing section 38 via the terminal 36B.

The processing section 38 includes a first known circuit for generating and outputting a focusing error signal FE in response to the output signals of the photodetectors 32A and 32B. In addition, the processing section 38 includes a second known circuit for generating and outputting a tracking error signal TE in response to the output signals of the photodetectors 32A and 32B. Furthermore, the processing section 38 includes a differential amplifier or a subtracter which generates and outputs a signal $FR_{DEF}$ depending on the difference between the output signals of the photodetectors 32A and 32B. The processing section 38 also includes a summing circuit or an adder which generates and outputs a signal $RF_{SUM}$ depending on the addition of the output signals of the photodetectors 32A and 32B.

The path-bent configuration provided by the waveguide lenses 30A and 30B of the reflection type enables the miniaturization of the optical integrated circuit.

It should be noted that each of the photodetectors 32A and 32B may not be divided.

Third Embodiment

Figure 8:
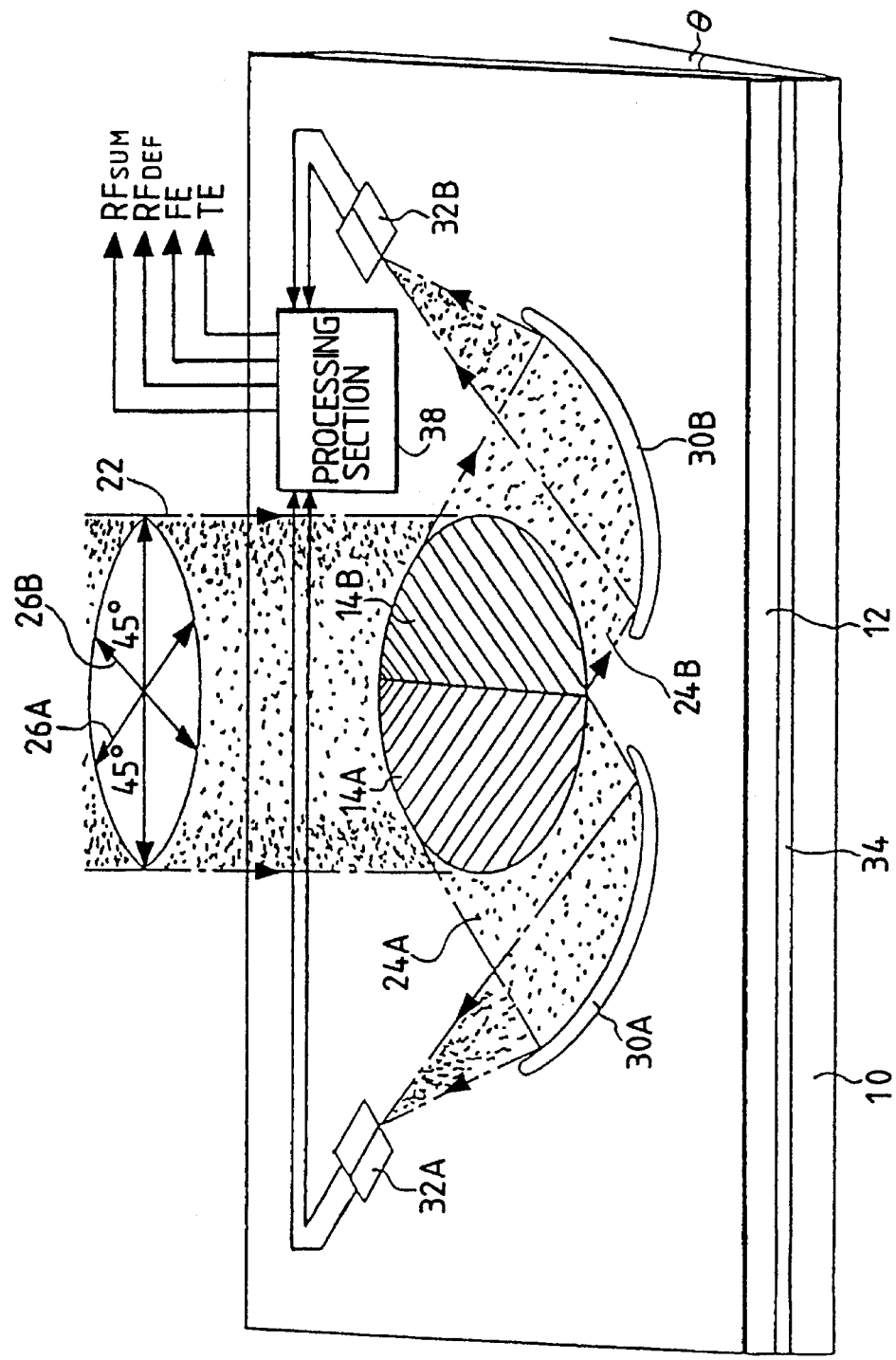
FIG. 8 is a diagram of a portion of an optical pickup device including an optical integrated circuit according to a third embodiment of this Invention.

FIG. 8 shows a third embodiment of this invention which is similar to the embodiment of FIG. 7 except for design changes indicated hereinafter. In the embodiment of FIG. 8, a processing section 38 is formed on a substrate 10 as a monolithic structure. It is preferable to simultaneously make the processing section 38 and photodetectors 32A and 32B.

The processing section 38 has a combination of for example, current-voltage converters, signal amplifiers, and operational amplifiers. The current-voltage converters act on the output signals of the photodetectors 32A and 32B.

The embodiment of FIG. 8 has an optoelectronic integrated circuit including RF amplifiers and an error-signal-generating matrix circuit in an optical disk player.

Figure 9:
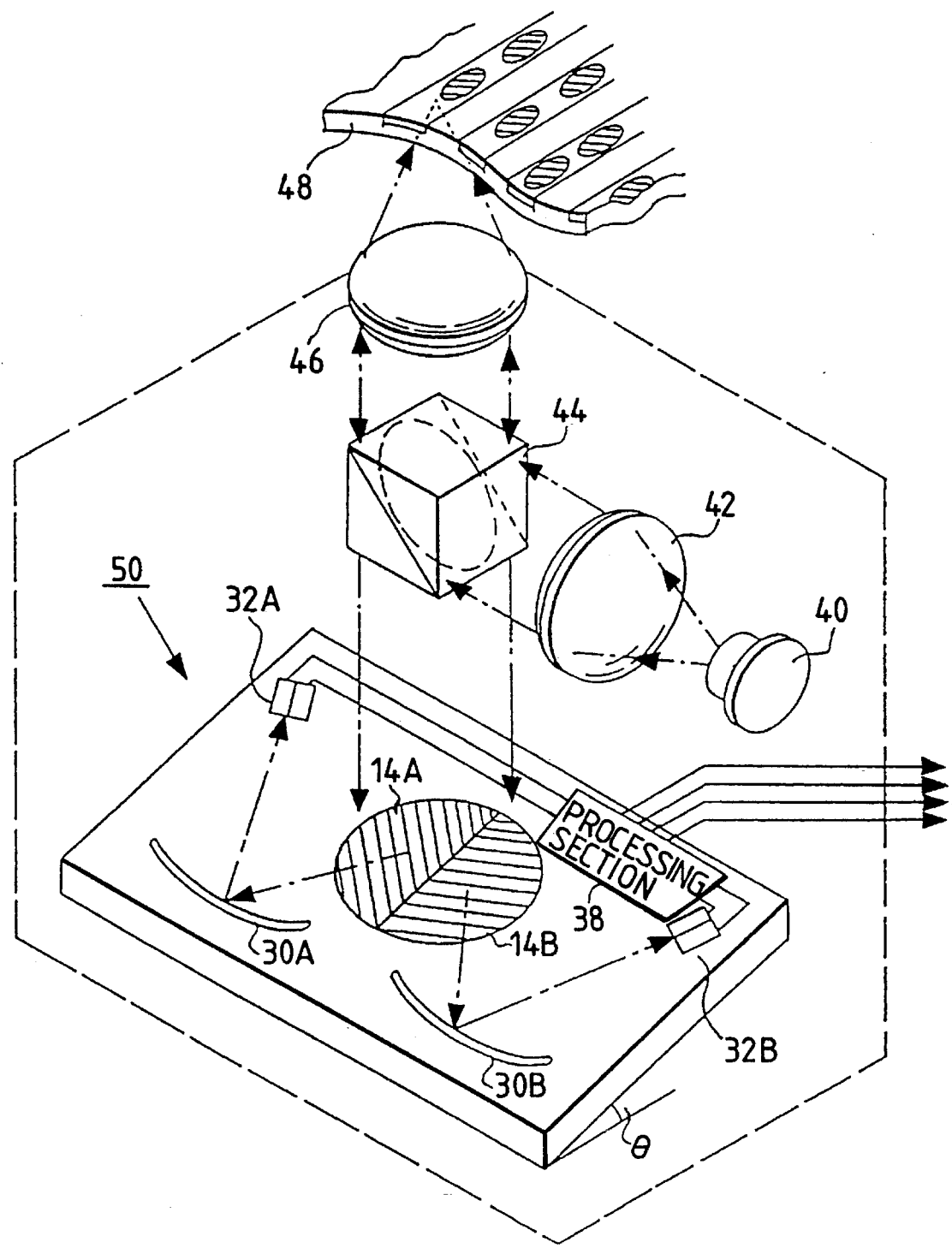
FIG. 9 is a perspective view of the optical pickup device in FIG. 8.

FIG. 9 shows an optical pickup device for an optical disk which contains the optical integrated circuit of FIG. 8. With reference to FIG. 9, the optical pickup device includes a semiconductor laser 40 for emitting a laser light beam toward a collimating lens 42. The laser light beam is made by the collimating lens 42 into an approximately collimated light beam. The approximately collimated light beam is incident to a beam splitter 44, being reflected at a semitransparent mirror plane within the beam splitter 44. The reflection-resultant light beam agrees with a forward light beam which travels from the beam splitter 44 to an objective lens 46. The forward light beam is focused by the objective lens 46 into a spot on the information recording surface of an optical disk 48.

The light beam undergoes modulation in response to information recorded on the optical disk 48 when meeting the information recording surface of the optical disk 48. Specifically, the light beam undergoes intensity-varying modulation in the case of a phase pit disk such as a CD (a compact disc). The light beam undergoes polarization-rotating modulation in the case of a magneto-optical disk such as an MD (a MiniDisc).

The modulation-resultant light beam agrees with a return light beam which moves back from the optical disk 48 to the beam splitter 44 via the objective lens 46 along a path just opposite the forward light path. The return light beam passes through the semitransparent mirror plane within the beam splitter 44, and then reaches the grating couplers 14A and 14B in the optical integrated circuit 50. The return light beam is converted into the corresponding electric signals by the optical integrated circuit 50. The electric signals are processed by the processing section 38 into the focusing error signal FE, the tracking error signal TE, and the information-representing signal RF.

The processing section 38 may be modified to detect an ATIP signal in the case of a CD-WO. The processing section 38 may also be modified to detect an ADIP signal in the case of a recordable MD.

Fourth Embodiment

Figure 10:
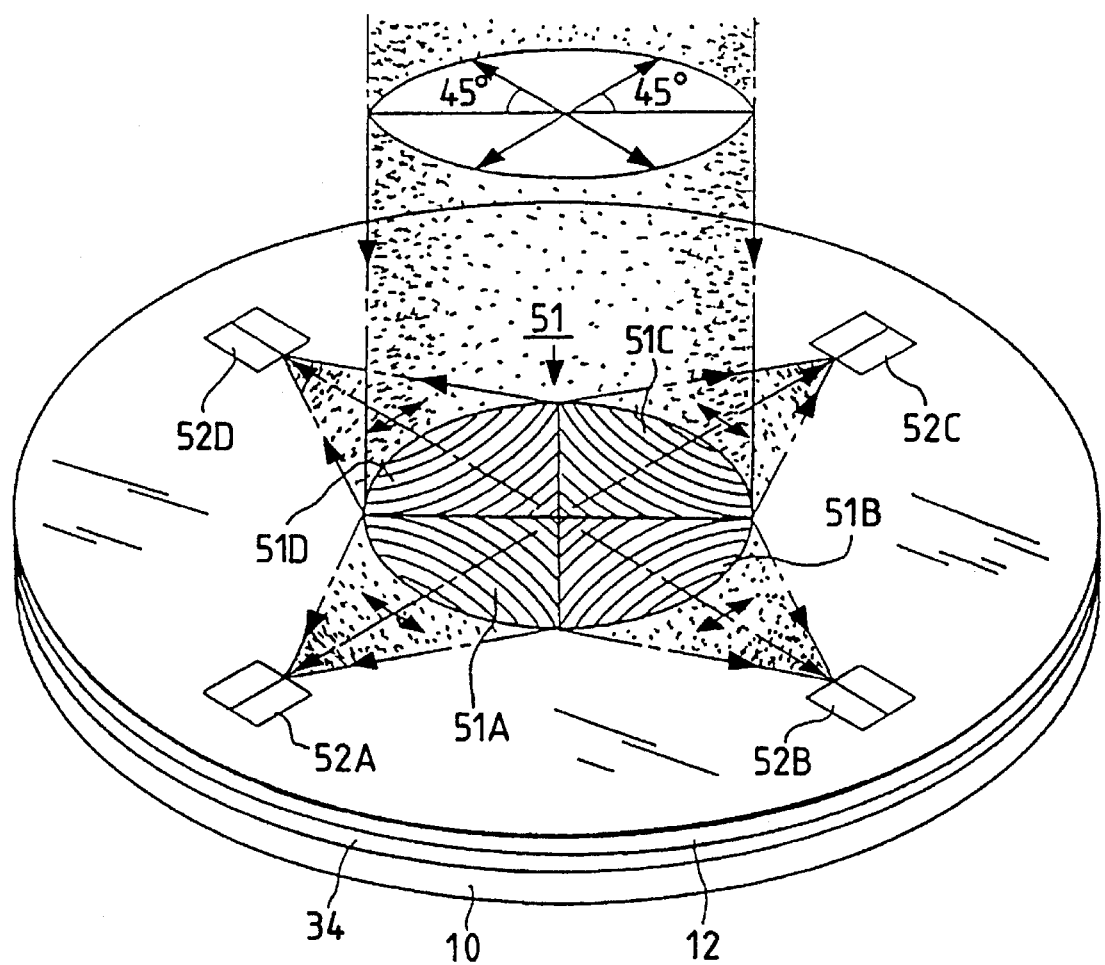
FIG. 10 is a perspective view of an optical integrated circuit according to a fourth embodiment of this invention.

FIG. 10 shows a fourth embodiment of this invention which is similar to the embodiment of FIG. 8 except for design changes indicated hereinafter. The embodiment of FIG. 10 includes a grating coupler 51 of a circular configuration on a substrate 10. The grating coupler 51 is divided into four sectorial sections (regions) 51A, 51B, 51C, and 51D. The sections 51A and 51C occupying opposite areas are designed to select components of an incident light beam which are polarized in a first same direction. The sections 51B and 51D occupying opposite areas are designed to select components of the incident light beam which are polarized in a second same direction perpendicular to the first same direction.

Each of the sections 51A, 51B, 51C, and 51D of the grating coupler 51 is designed to have a light focusing function. Accordingly, it is unnecessary to provide separate waveguide lenses. Each of the sections 51A, 51B, 51C, and 51D has a given optical pattern composed of approximately parallel curved lines spaced at substantially equal intervals (substantially equal pitches). Thus, each of the sections 51A, 51B, 51C, and 51D forms a curved grating coupler.

Photodetectors 52A, 52B, 52C, and 52D are provided on the substrate 10 at positions in optical paths extending from the output sides of the sections 51A, 51B, 51C, and 51D of the grating coupler 51 respectively. Each of the photodetectors 52A, 52B, 52C, and 52D is divided into two segments exposed to a light beam. The photodetectors 52A, 52B, 52C, and 52D are electrically connected to a processing section (not shown) within or outside an optical integrated circuit.

The embodiment of FIG. 10 operates as follows. The incident light beam is separated by the grating coupler 51 into four light beams outputted from the sections 51A, 51B, 51C, and 51D thereof respectively and propagated in a waveguide layer 12. The light beams outputted from the sections 51A and 51C are polarized in a first common (same) direction. The light beams outputted from the sections 51B and 51D are polarized in a second common (same) direction perpendicular to the first common direction. The light beams outputted from the sections 51A, 51B, 51C, and 51D of the grating coupler 51 are focused on the photodetectors 52A, 52B, 52C, and 52D respectively. The photodetectors 52A, 52B, 52C, and 52D convert the received light beams into corresponding electric signals. The photodetectors 52A, 52B, 52C, and 52D output the electric signals to the processing section. The processing section generates an information-representing signal, a tracking error signal, and a focusing error signal in response to the output signals of the photodetectors 52A, 52B, 52C, and 52D.

The processing section preferably includes a subtracter for generating a signal depending on the difference between the output signals of the photodetectors 52A and 52C, and a subtracter for generating a signal depending on the difference between the output signals of the photodetectors 52B and 52D. These difference signals can be used to cancel a positional error in the angle of an objective lens (not shown) and a spatial unbalance (a spatial unevenness) in the distribution of the intensity of the incident light beam. In the case of a phase pit disk, the processing section can generate a tracking error signal of the heterodyne type.

It should be noted that each of the photodetectors 52A, 52B, 52C, and 52D may not be divided. The sections 51A, 51B, 51C, and 51D of the grating coupler 51 may have another optical pattern.

Fifth Embodiment

Figure 11:
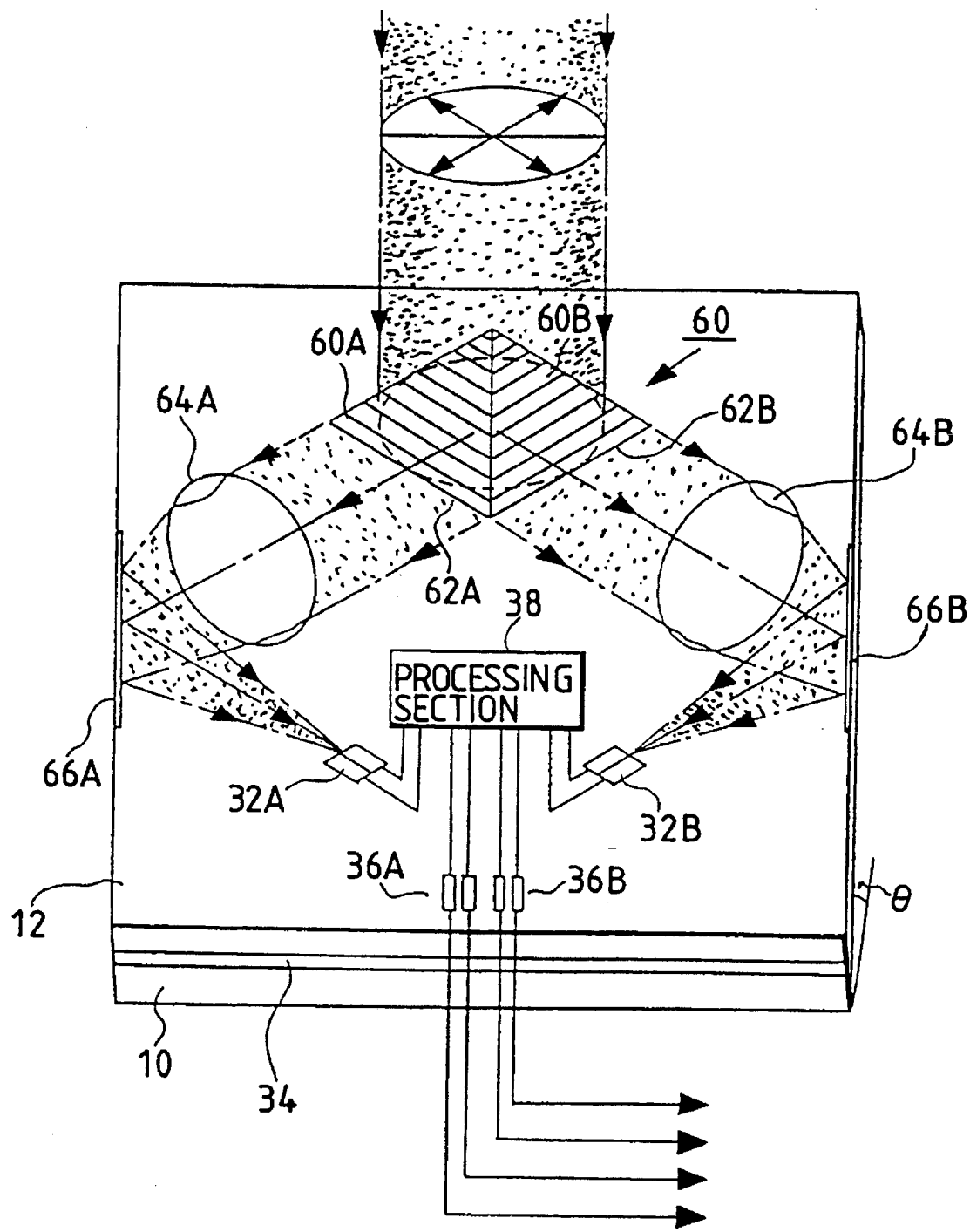
FIG. 11 is a diagram of an optical integrated circuit according to a fifth embodiment of this invention.

FIG. 11 shows a fifth embodiment of this invention which is similar to the embodiment of FIG. 8 except for design changes indicated hereinafter. The embodiment of FIG. 11 includes a grating coupler 60 of an approximately square configuration on a substrate 10. The grating coupler 60 is divided into triangular grating sections (regions) 60A and 60B corresponding to the grating couplers 14A and 14B in FIG. 8 respectively.

The grating sections 60A and 60B have straight output edges 62A and 62B approximately parallel with the wavefronts of output light beams propagated in a waveguide layer 12 respectively. This arrangement reduces aberration.

Waveguide lenses 64A and 64B are formed in optical paths extending from the output edges 62A and 62B of the grating sections 60A and 60B respectively. The waveguide lenses 64A and 64B use geodesic lenses respectively.

End surfaces of the waveguide layer 12 are provided with mirrors 66A and 66B meeting optical paths extending from the waveguide lenses 64A and 64B respectively.

The embodiment of FIG. 11 operates as follows. An incident light beam is separated by the grating coupler 60 into two light beams outputted from the grating sections 60A and 60B respectively and propagated in the waveguide layer 12. The light beams outputted from the grating sections 60A and 60B travel to the waveguide lenses 64A and 64B respectively. The light beams pass through the waveguide lenses 64A and 64B, and then reach the mirrors 66A and 66B respectively. The light beams are reflected by the mirrors 66A and 66B toward photodetectors 32A and 32B respectively. The light beams are focused by the waveguide lenses 64A and 64B on the photodetectors 32A and 32B while being reflected by the mirrors 66A and 66B respectively.

Sixth Embodiment

Figure 12:
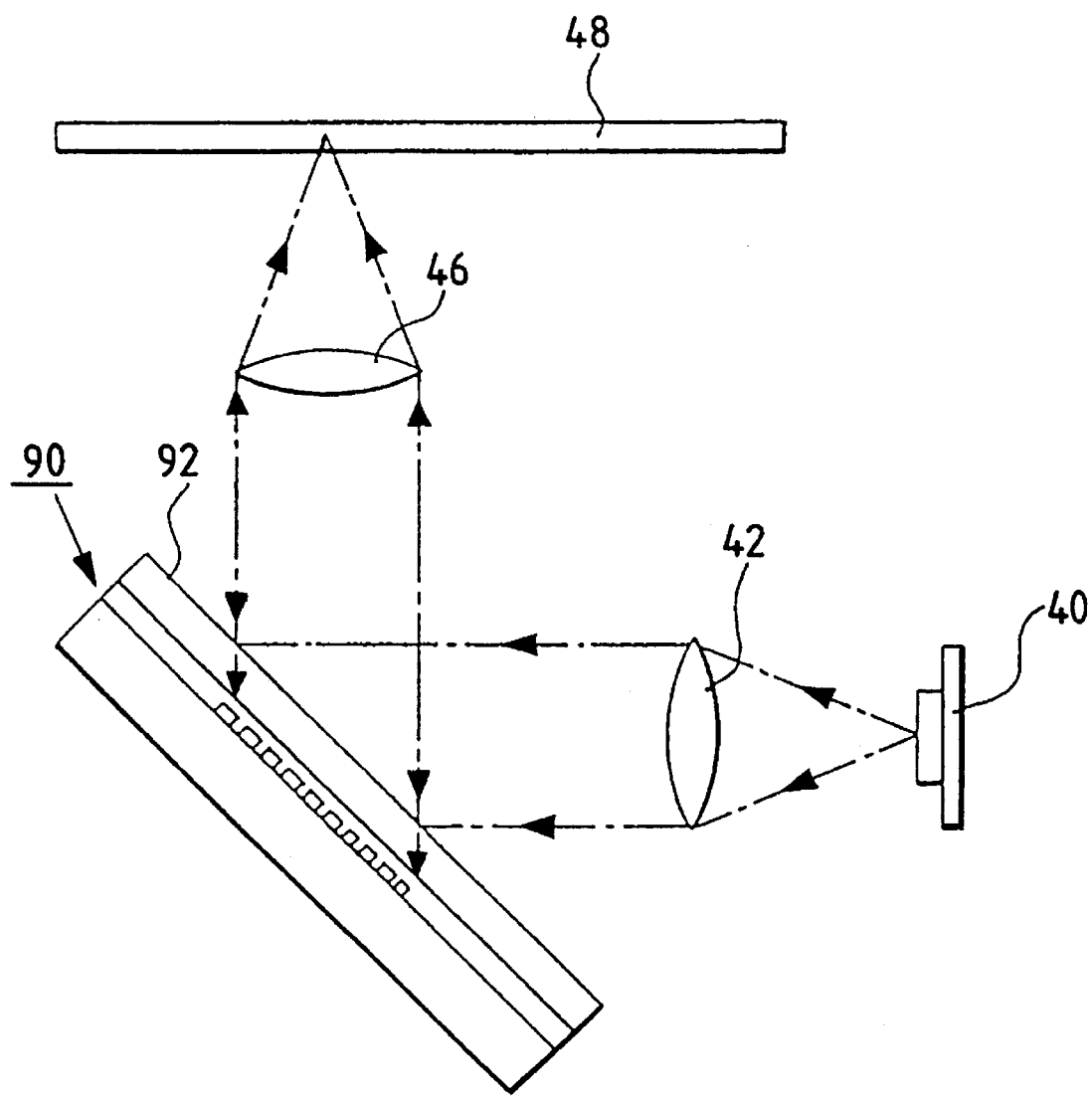
FIG. 12 is a diagram of a portion of an optical pickup device including an optical integrated circuit according to a sixth embodiment of this invention.
Figure 13:
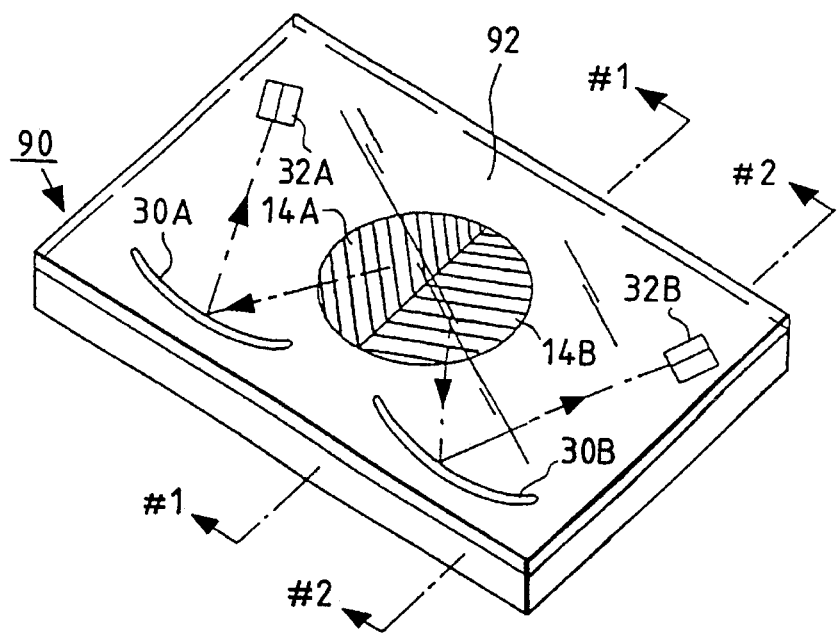
FIG. 13 is a perspective view of the optical integrated circuit in FIG. 12.
Figure 14:
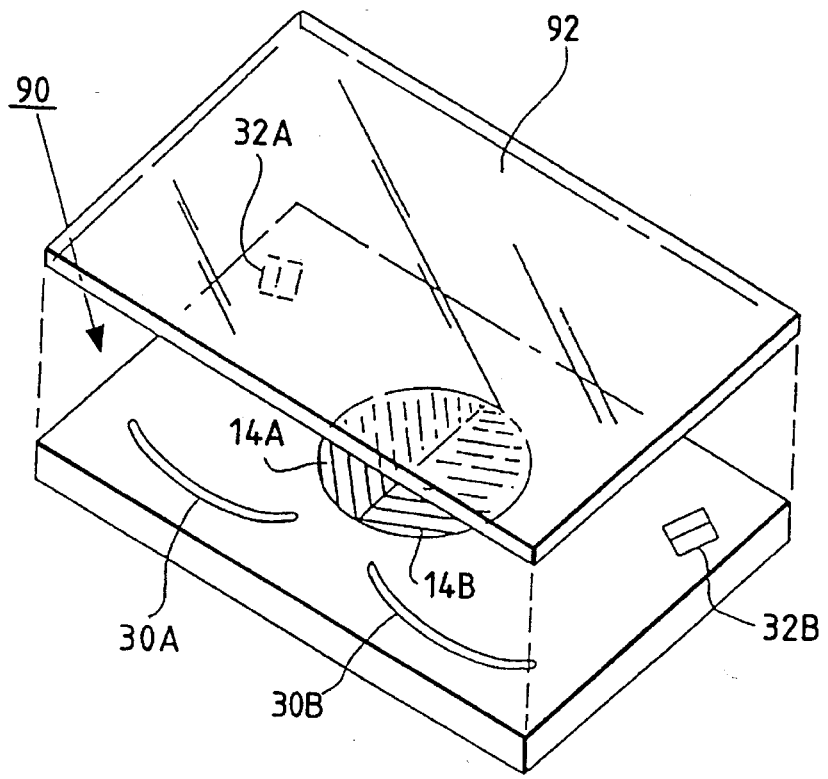
FIG. 14 is a perspective exploded view of the optical integrated circuit in FIG. 12.

With reference to FIG. 12, an optical pickup device includes an optical Integrated circuit 90 on which a semitransparent mirror 92 is provided. The optical integrated circuit 90 uses the optical integrated circuit in FIG. 8 or one of the optical integrated circuits in the first embodiment, the second embodiment, the fourth embodiment, and the fifth embodiment.

As shown in FIGS. 13, 14, 15, and 16, the semitransparent mirror 92 extends on an upper surface of the optical integrated circuit 90. A buffer layer 94 is provided on a waveguide layer 12. The buffer layer 94 extends on grating couplers 14A and 14B. The buffer layer 94 is formed by a spin coat using liquid coating material such as OCD. The semitransparent mirror 92 includes a film of Au which is formed on the buffer layer 94 by a sputtering process.

With reference back to FIG. 12, a semiconductor laser 40 emits a laser light beam toward a collimating lens 42. The laser light beam is incident to the collimating lens 42, being made thereby into an approximately collimated light beam. The approximately collimated light beam travels from the collimating lens 42 to the semitransparent mirror 92 on the optical integrated circuit 90. The approximately collimated light beam is reflected by the semitransparent mirror 92, forming a forward light beam traveling from the semitransparent mirror 92 to an objective lens 46. The forward light beam passes through the objective lens 46, being focused thereby on an optical disk 48.

The light beam is reflected by the optical disk 48. The reflection-resultant light beam agrees with a return light beam which travels back from the optical disk 48 to the objective lens 46. The return light beam passes through the objective lens 46, and then reaches the semitransparent mirror 92. The return light beam passes through the semitransparent mirror 92 before being incident to the grating couplers 14A and 14B. The incident light beam is changed and separated by the grating couplers 14A and 14B into light beams propagated in the waveguide layer 12.

Figure 15:
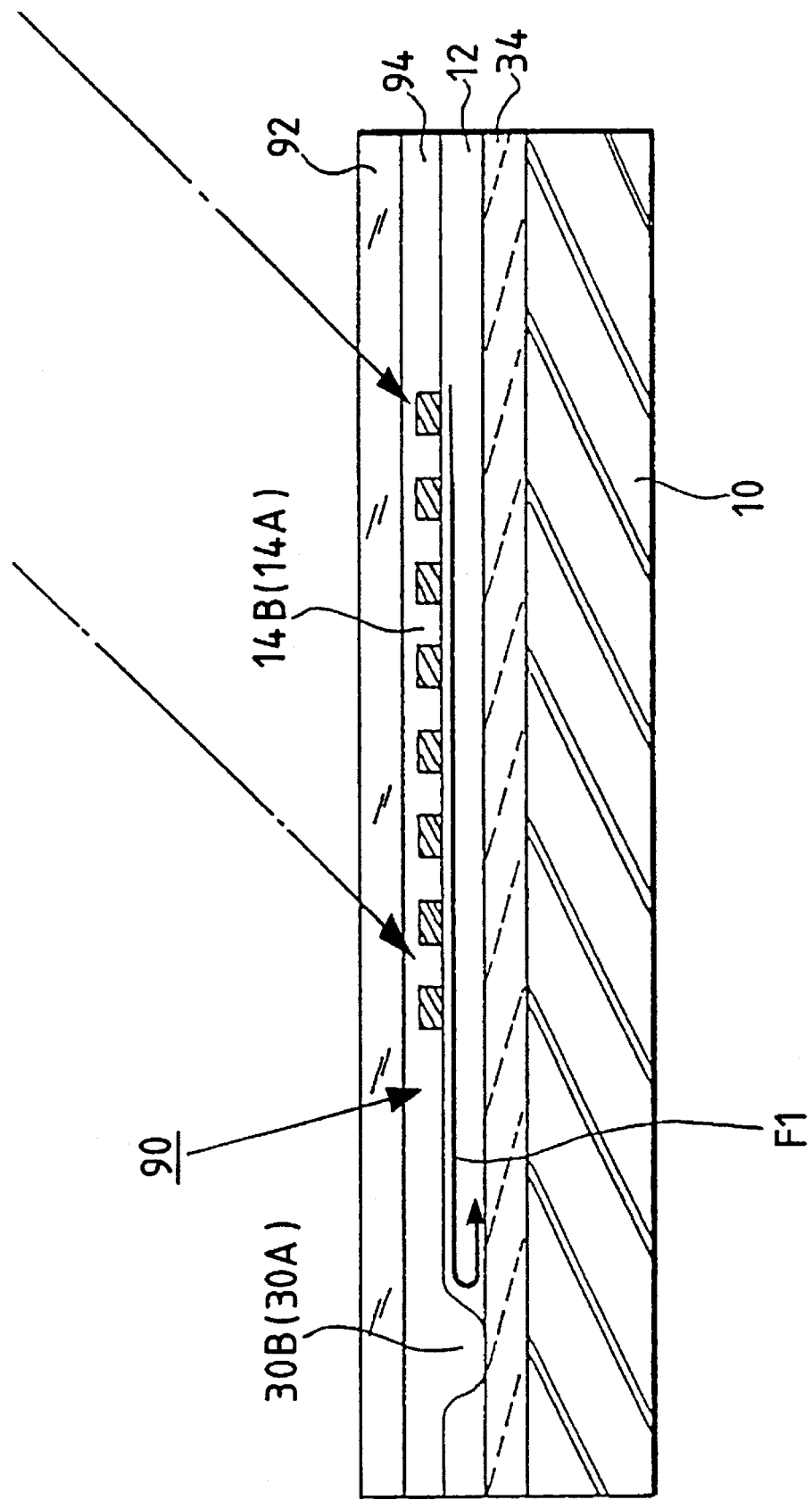
FIG. 15 is a sectional view of the optical integrated circuit taken along the line #1—#1 in FIG. 13.
Figure 16:
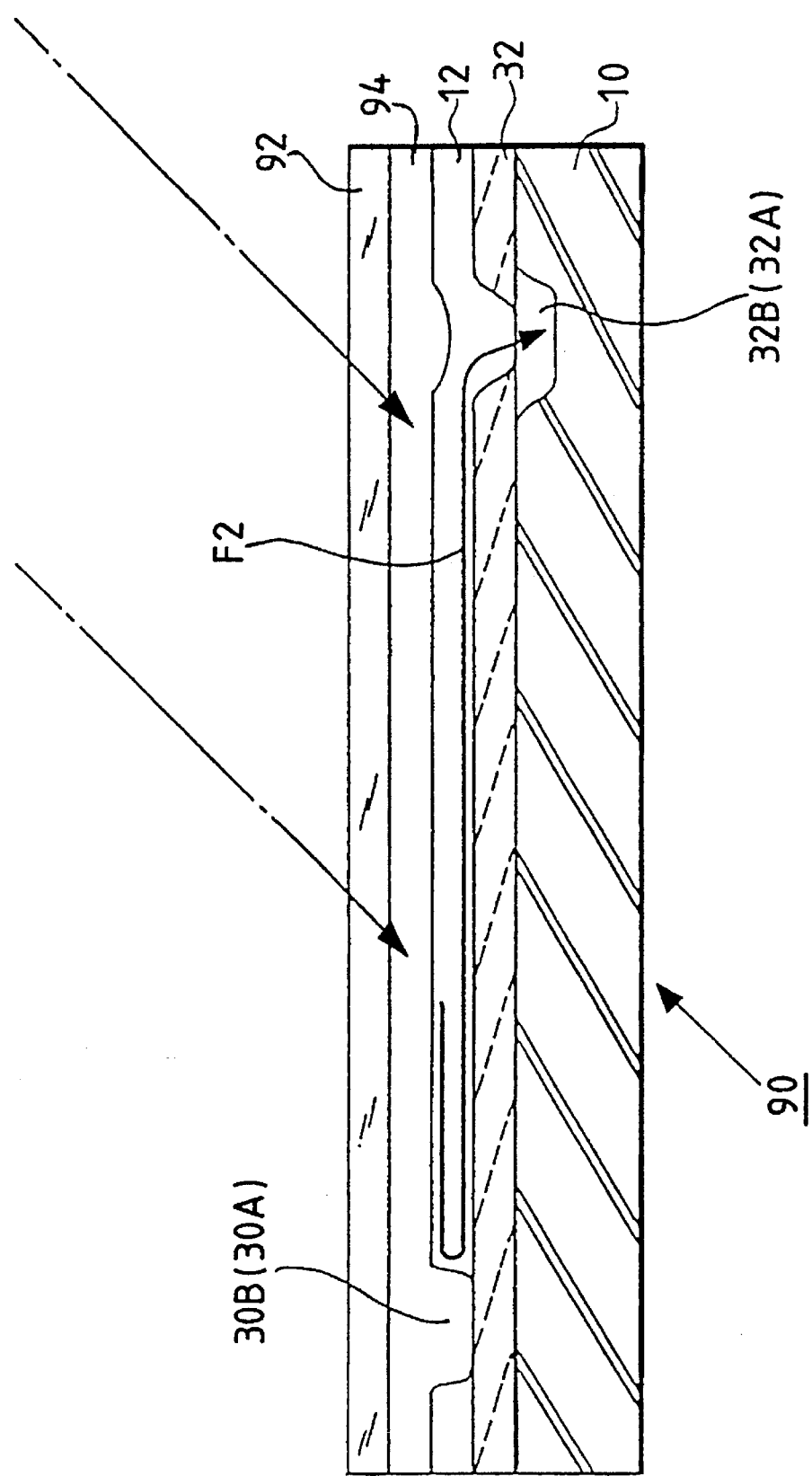
FIG. 16 is a sectional view of the optical integrated circuit taken along the line #2—#2 in FIG. 13.

As shown in FIG. 15, the grating coupler 14B (or 14A) introduces a light beam F1 into the waveguide layer 12. The light beam F1 is propagated from the grating coupler 1B (or 14A) to a waveguide lens 30B (or 30A) along the waveguide layer 12 before being reflected by the waveguide lens 30B (or 30A). As shown in FIG. 16, the light beam F2 which results from the reflection by the waveguide lens 30B (or 30A) is propagated to a photodetector 32B (or 32A) along the waveguide layer 12.

The semitransparent mirror 92 and the buffer layer 94 can be formed by thin-film making processes (wafer processes). Therefore, the semitransparent mirror 92 and the buffer layer 94 can be incorporated into the optical integrated circuit 90. Thus, mass production of such optical integrated circuits is easily enabled by a sequence of fabrication steps.

Figure 17:
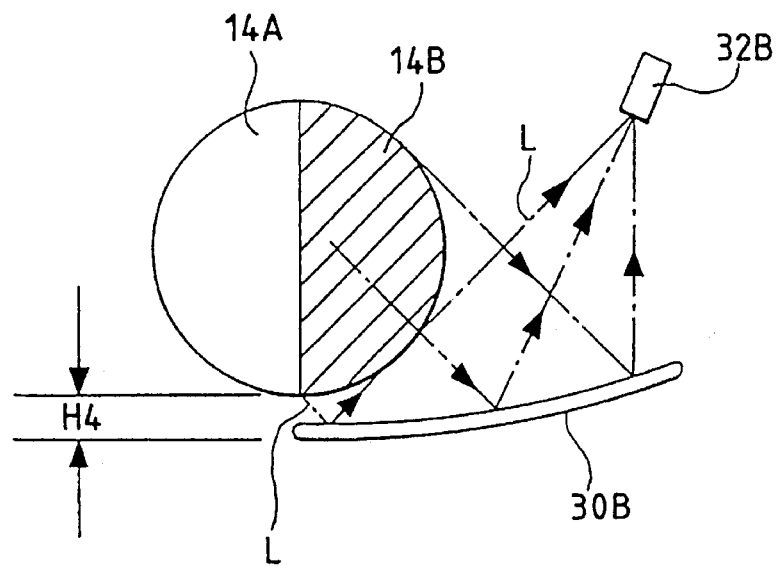
FIG. 17 is a diagram of a portion of the optical integrated circuit in FIG. 12.

The height of the optical pickup device of FIG. 12 can be small. As shown in FIG. 17, the light beam outputted from the grating coupler 14B travels along a direction inclined at an angle of 45°, and then reaches the waveguide lens 30B. The light beam is reflected toward and focused on the photodetector 32B by the waveguide lens 30B. In the case where the waveguide lens 30B is designed so that a portion L of the light beam outputted from the innermost part (the lowermost part) of the grating coupler 14B will be reflected by the waveguide lens 30B and will then travel along a path partially adjoining an outer edge of the grating coupler 14B, the waveguide optical path length H4 can be small and hence the height of the optical pickup device can also be small. The other waveguide lens 30A may be similarly designed.

Seventh Embodiment

Figure 18:
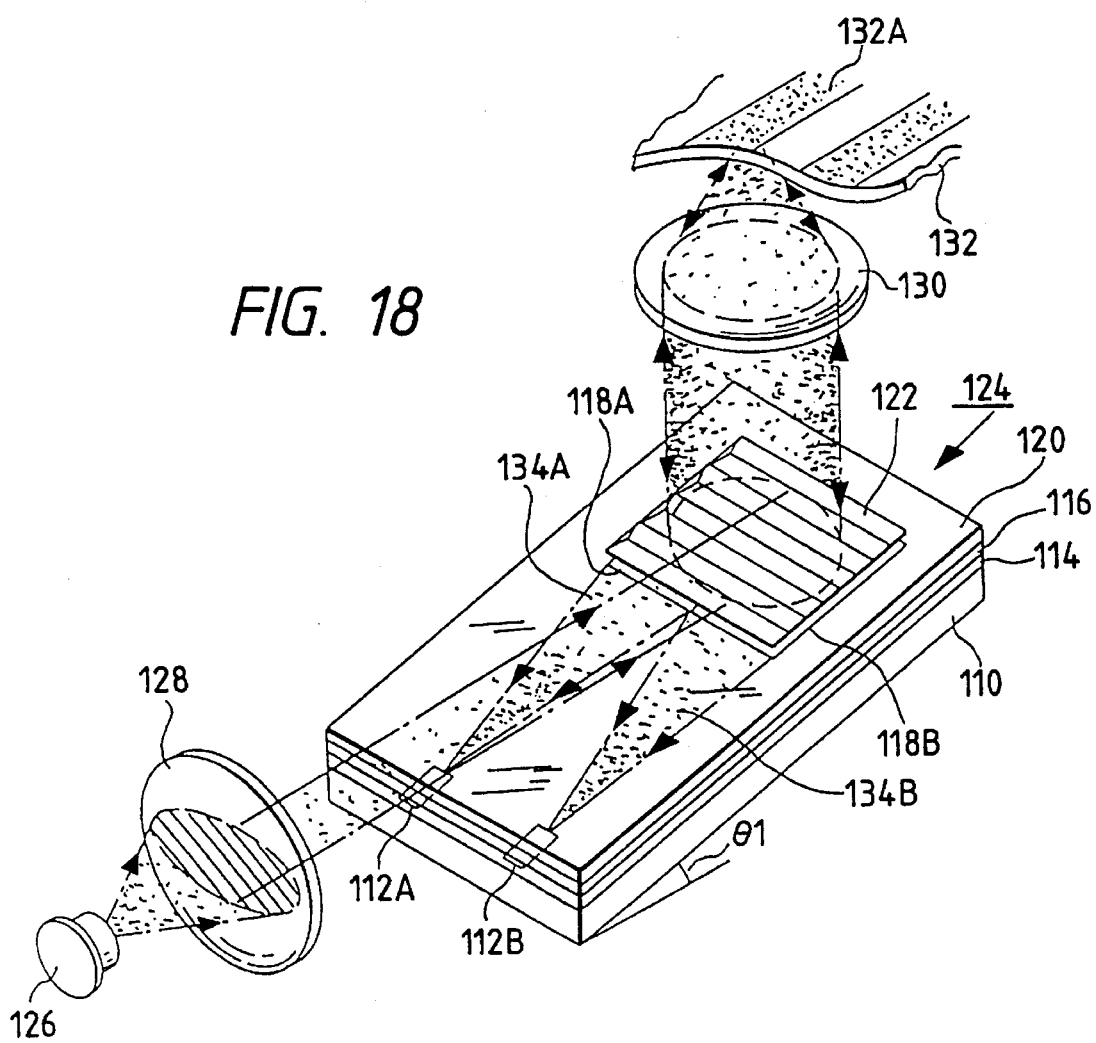
FIG. 18 is a diagram of a portion of an optical pickup device including an optical integrated circuit according to a seventh embodiment of this invention.
Figure 19:
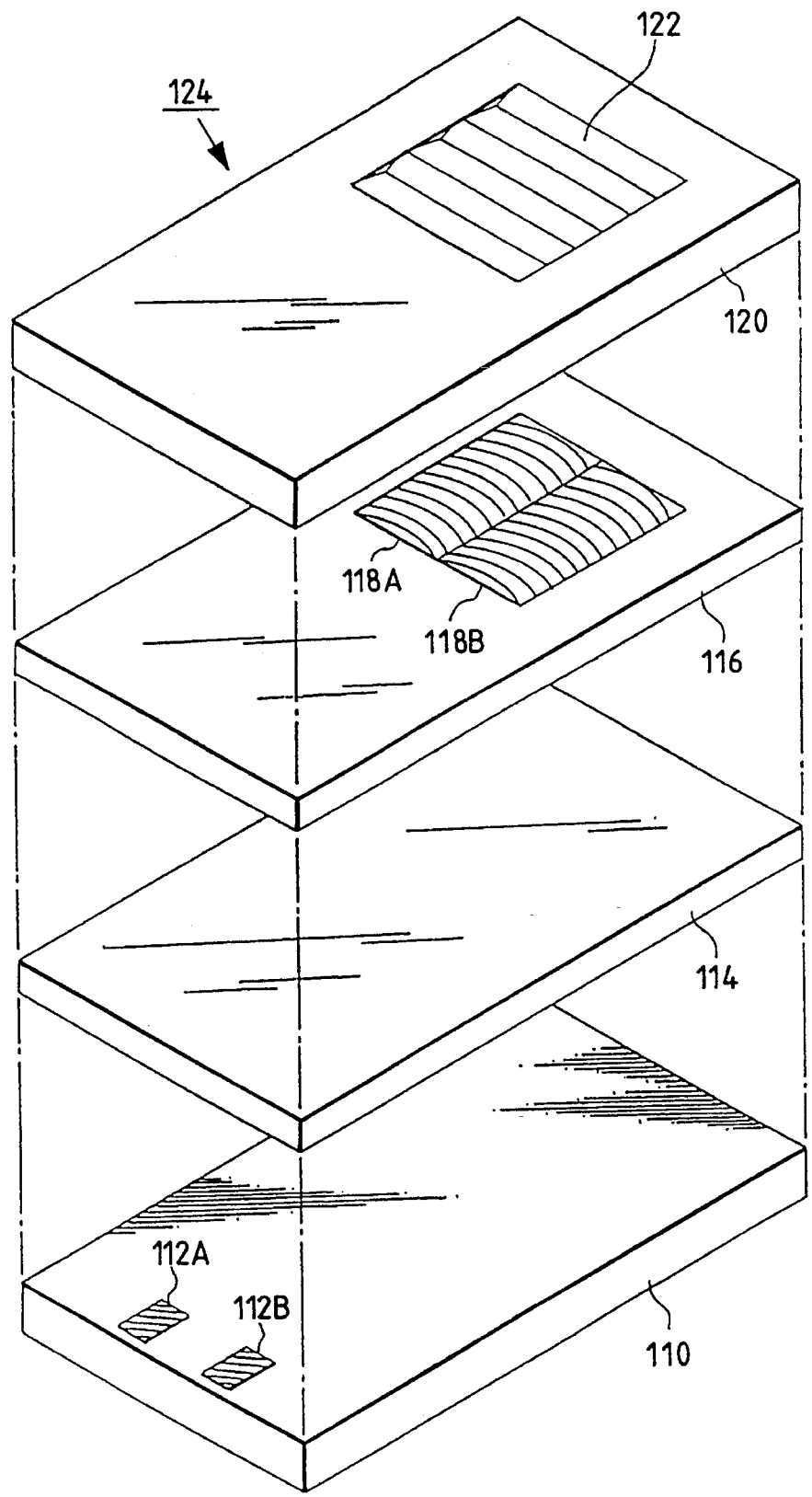
FIG. 19 is a perspective exploded view of the optical integrated circuit in FIG. 18.
Figure 20:
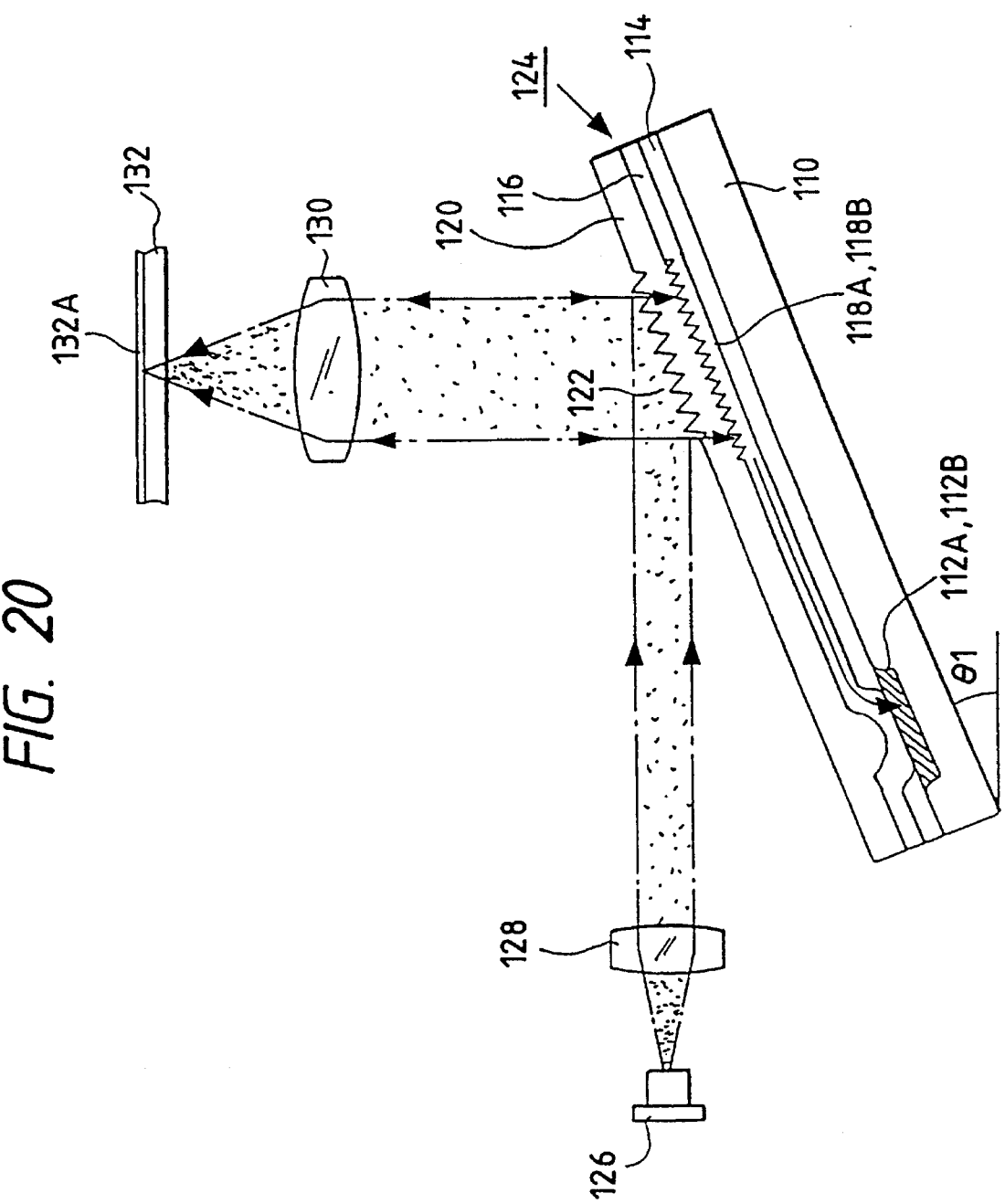
FIG. 20 is a sectional diagram of the optical pickup device in FIG. 18.

With reference to FIGS. 18, 19, and 20, an optical pickup device includes an optical integrated circuit 124 having a substrate 110 which is formed with photodetectors 112A and 112B. A buffer layer 114 is formed on the substrate 110. A waveguide layer 116 is superposed on the buffer layer 114. The waveguide layer 116 is composed of a thin film having a thickness comparable to the wavelength of light to be handled. The waveguide layer 116 is provided with grating couplers 118A and 118B. A buffer layer 120 is formed on the waveguide layer 116. The buffer layer 120 is provided with a semitransparent reflection-type grating 122.

Each of the grating couplers 118A and 118B has a rectangular shape. The semitransparent reflection-type grating 122 has a square configuration. The grating couplers 118A and 118B compose a square configuration which aligns and overlaps with the square configuration of the semitransparent reflection-type grating 122.

A semiconductor laser 126 and a collimating lens 128 are successively arranged along an optical path toward a first input side of the semitransparent reflection-type grating 122. A recording disk 132 and an objective lens 130 are successively arranged along an optical path toward a second input side of the semitransparent reflection-type grating 122.

During the fabrication of the optical integrated circuit 124, an $SiO_2$ buffer layer 114 is formed on a substrate 110 of an Si crystal by a surface heating and oxidizing process. A waveguide layer 116 is formed on the buffer layer 114 by a sputtering process. The waveguide layer 116 is made of Corning #7059 glass. A film of Si-N is formed on the waveguide layer 116 by a plasma CVD process. The Si-N film is shaped by a dry etching process into given patterns corresponding to the grating couplers 118A and 118B respectively. A buffer layer 120 and a semitransparent reflection-type grating 122 are formed on the waveguide layer 116 by thin film making processes. The grating couplers 118A and 118B, and the semitransparent reflection-type grating 122 can be made by repeating similar fabrication steps. This is advantageous in efficiently and inexpensively fabricating the optical integrated circuit 124.

The Si crystal for the substrate 110 has a conduction type which agrees with the "n" type. Portions of the substrate 110 are doped with p-type impurities (for example, boron) to provide pn junctions forming the photodetectors 112A and 112B. It is preferable to divide each of the photodetectors 112A and 112B into two segments. In this case, a focusing error signal, a tracking error signal, and an information-representing signal can be generated on the basis of the output signals of the photodetectors 112A and 112B.

The optical pickup device of FIGS. 18, 19, and 20 operates as follows. The semiconductor laser 126 emits a laser light beam having an ellipsoidal cross-section. The laser light beam emitted from the semiconductor laser 126 is incident to the collimating lens 128, and is made thereby into a collimated light beam. The collimated light beam travels from the collimating lens 128 to the semitransparent reflection-type grating 122 in the optical integrated circuit 124. The collimated light beam is reflected by the semitransparent reflection-type grating 122 at an angle of about 90° while the ellipsoidal cross-section thereof is shaped into an approximately circular cross-section by the semitransparent reflection-type grating 122.

The reflection-resultant light beam is directed from the semitransparent reflection-type grating 122 toward the objective lens 130. The reflection-resultant light beam is incident to the objective lens 130 as a forward light beam, being focused on the recording disk 132 thereby. The forward light beam is reflected by the recording disk 132, being made into a return light beam. The light beam undergoes rotation of a polarization plane due to the Kerr effect when being applied to and reflected by a magnetic recording portion 132A of the recording disk 132. The return light beam travels back from the recording disk 132, and passes through the objective lens 130. Subsequently, the return light beam reaches the semitransparent reflection-type grating 122. The return light beam passes through the semitransparent reflection-type grating 122 before being incident to the grating couplers 118A and 118B. The return light beam is introduced into the waveguide layer 116 via the grating couplers 118A and 118B, being changed and separated into light beams 134A and 134B propagated in the waveguide layer 116 respectively.

The light beams 134A and 134B are focused by the grating couplers 118A and 118B on the photodetectors 112A and 112B respectively while being propagated in the waveguide layer 116. The photodetectors 112A and 112B convert the received light beams into corresponding electric signals, and output the electric signals to a processing section (not shown). The processing section generates an information-representing signal, a focusing error signal, and a tracking error signal in response to the output signals of the photodetectors 112A and 112B.

As shown in FIGS. 18 and 20, the optical integrated circuit 124 is inclined with respect to a horizontal plane at a given angle θ1. In the case where the semitransparent reflection-type grating 122 is designed to shape a light beam with a vertical-to-horizontal dimension ratio (an aspect ratio) of 1:3 into a light beam with a vertical-to-horizontal dimension ratio (an aspect ratio) of 1:1, the inclination angle θ1 of the optical integrated circuit 124 is equal to about 20°.

Such a small inclination angle of the optical integrated circuit 124 provides the following advantages. A plane perpendicular to the optical axis related to the light beam incident to the waveguide layer 116 is approximately parallel to the plane of the waveguide layer 116, so that the incident light beam is efficiently introduced into the waveguide layer 116. The angle between the optical axes related to the light beams 134A and 134B in the waveguide layer 116 is relatively large, and hence the optical integrated circuit 124 can be miniaturized. The orders of diffraction light beams coupled with the grating couplers 118A and 118B are only "−1" and "−2". Since the even-order diffraction light beam is negligible, only the −1st order diffraction light beam is effective so that an enhanced efficiency of use of the light is attained.

Figure 21:
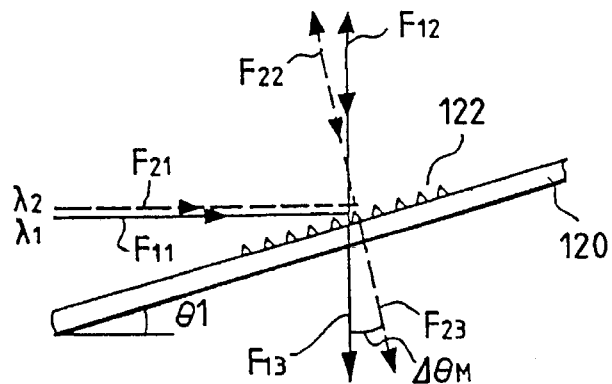
FIG. 21 is a sectional diagram of a buffer layer provided with a semitransparent reflection-type grating in FIG. 18.

The combination of the two grating couplers 118A and 118B can prevent or suppress a reduction of the coupling efficiency which would be caused by a variation in the wavelength of the laser light beam. With reference to FIG. 21, a light beam having a wavelength λ1 is applied to the semitransparent reflection-type grating 122 along a direction F11, and is then reflected toward a direction F12 by the semitransparent reflection-type grating 122. A light beam incident to the semitransparent reflection-type grating 122 along a direction opposite the direction F12 passes through the semitransparent reflection-type grating 122, and travels in a direction F13.

It is now assumed that the wavelength of the light beam changes from the value λ1 to a value λ2, the light beam applied to the semitransparent reflection-type grating 122 along a direction F21 is reflected by the semitransparent reflection-type grating 122 toward a direction F22, that is, a direction corresponding to an optimal output (outgoing) angle. A light beam incident to the semitransparent reflection-type grating 122 along a direction opposite the direction F22 passes through the semitransparent reflection-type grating 122, and travels in a direction F23.

Figure 22:
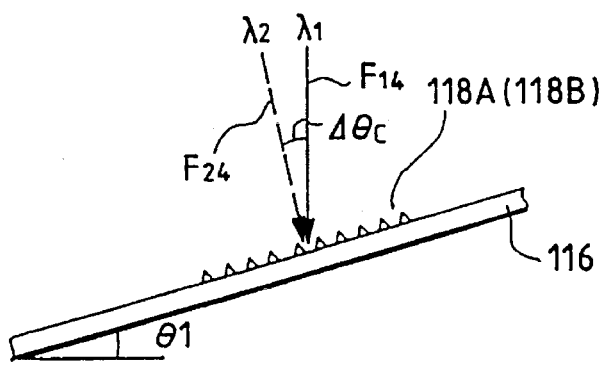
FIG. 22 is a sectional diagram of a waveguide layer provided with a grating coupler in FIG. 18.
Figure 23:
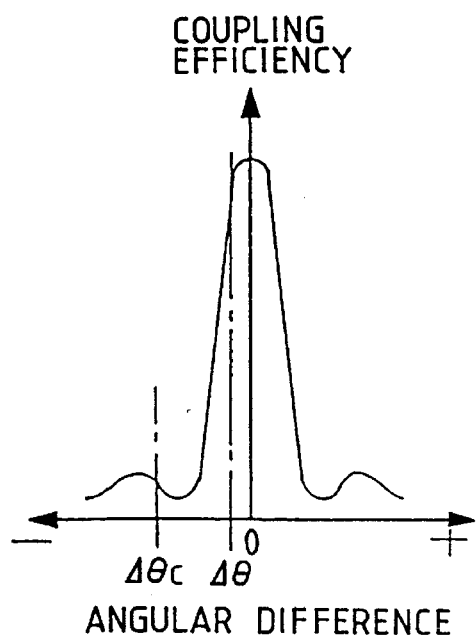
FIG. 23 is a diagram of the relation between an angular difference and a coupling efficiency.

With reference to FIG. 22, the optimal incidence angle with respect to the grating coupler 118A or 118B corresponds to a direction F14 in the case of a light beam having the wavelength λ1. The optimal incidence angle corresponds to a direction F24 in the case of a light beam having the wavelength λ2. As is made clear from the comparison between FIG. 21 and FIG. 22, the direction of a change in the optimal output (outgoing) angle with respect to the semitransparent reflection-type grating 122 in response to a wavelength variation agrees with the direction of a change in the optimal incidence angle with respect to the grating coupler 118A or 118B in response to the wavelength variation. Here, the difference between the change ΔθM in the optimal output (outgoing) angle and the change ΔθC in the optimal incidence angle is denoted by Δθ. In other words, Δθ=ΔθM−ΔθC. As shown in FIG. 23, the coupling efficiency provided at the difference Δθ is slightly smaller than the maximum coupling efficiency. Therefore, even when the wavelength of the light beam varies, a reduction in the coupling efficiency is suitably suppressed or prevented.

Eighth Embodiment

Figure 24:
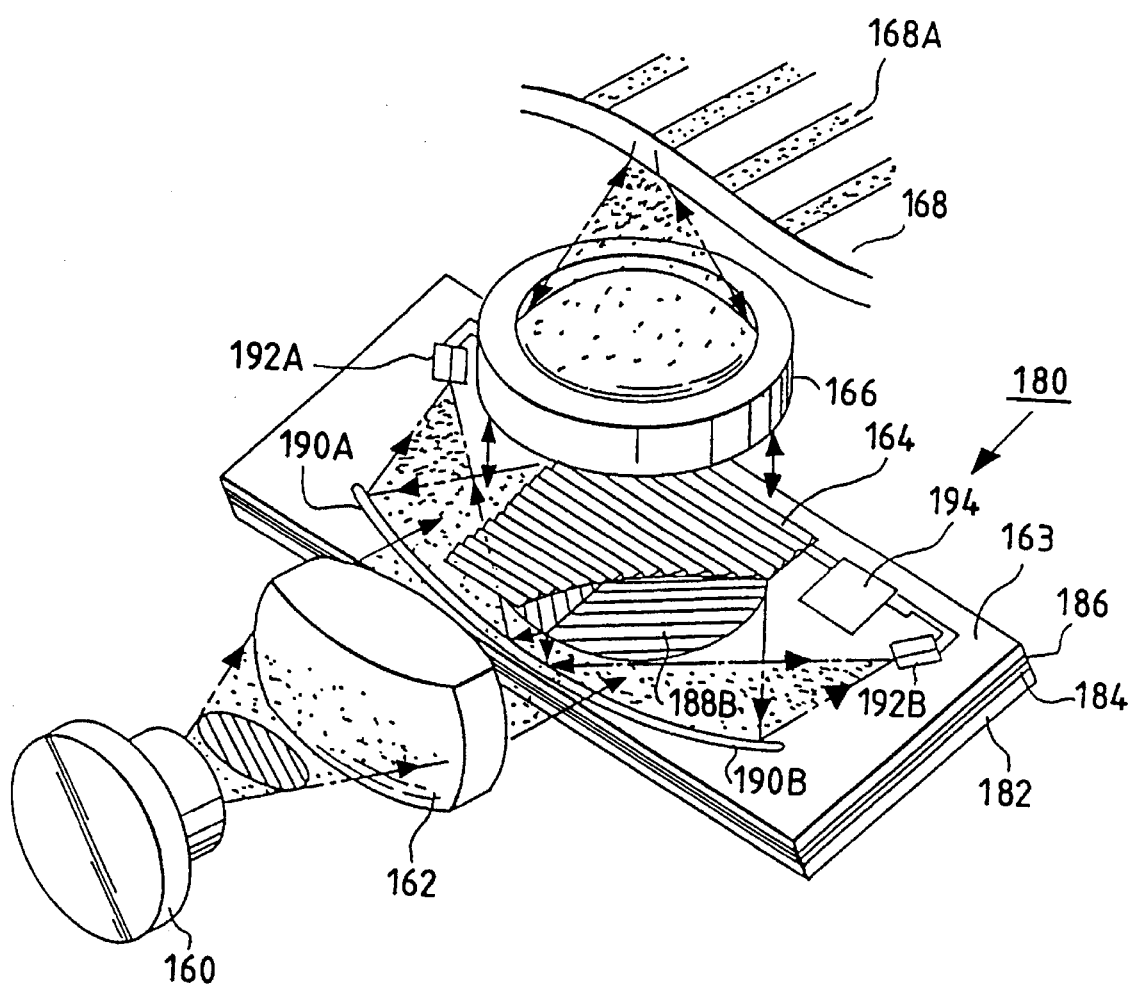
FIG. 24 is a diagram of a portion of an optical pickup device including an optical integrated circuit according to an eighth embodiment of this invention.
Figure 25:
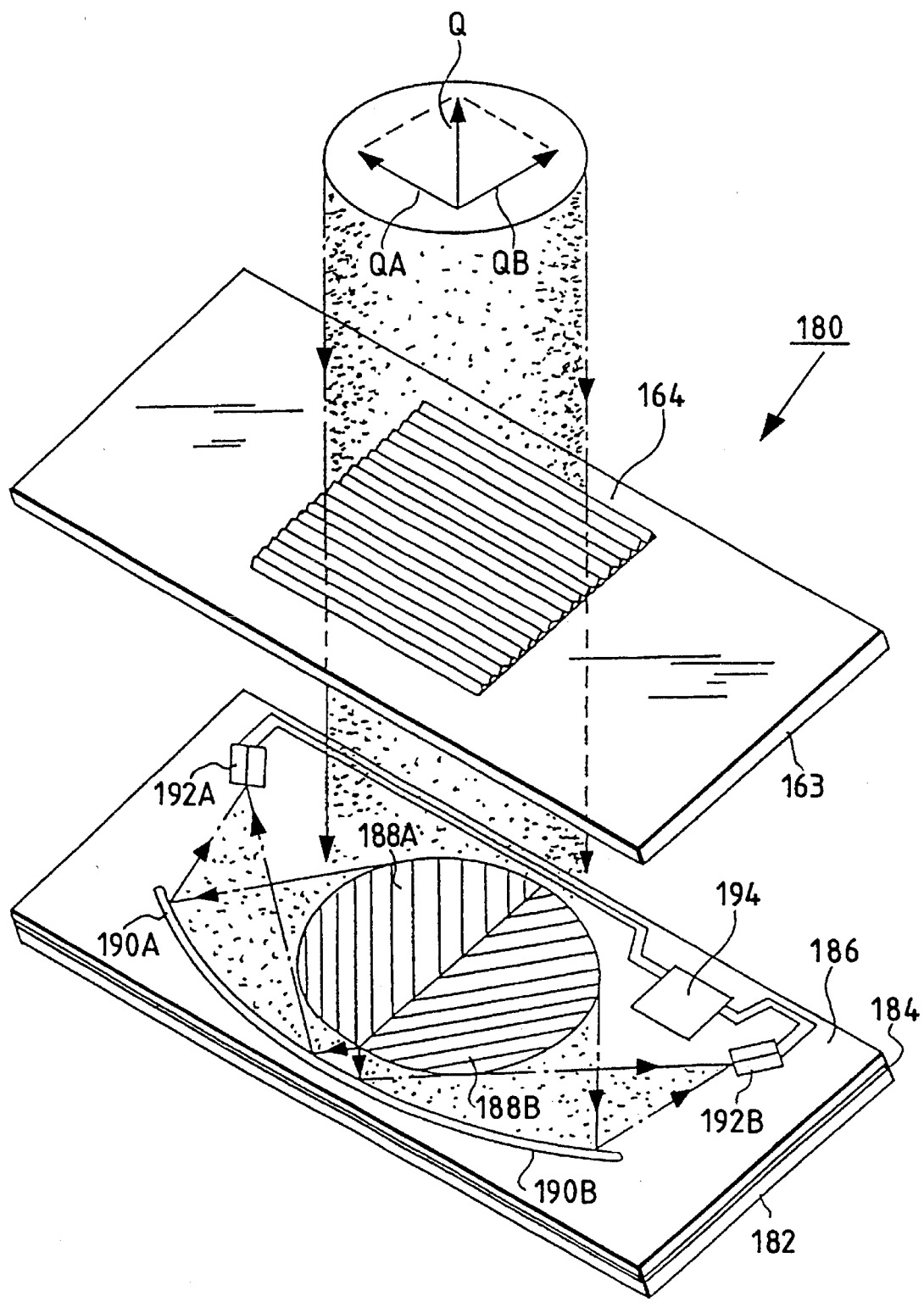
FIG. 25 is a perspective exploded view of the optical integrated circuit in FIG. 24.

With reference to FIGS. 24 and 25, an optical pickup device includes an optical integrated circuit 180 having a substrate 182 which is formed with photodetectors 192A and 192B. A buffer layer 184 is formed on the substrate 182. A waveguide layer 186 is superposed on the buffer layer 184. The waveguide layer 186 is composed of a thin film having a thickness comparable to the wavelength of light to be handled. The waveguide layer 186 is provided with grating couplers 188A and 188B. A buffer layer 163 is formed on the waveguide layer 186. The buffer layer 163 is provided with a semitransparent reflection-type grating 164.

Each of the grating couplers 188A and 188B has a semicircular configuration. The grating couplers 188A and 188B adjoin each other, composing a full circular configuration. Each of the grating couplers 188A and 188B provides a coupling (a conversion) between a collimated light beam propagated outside the waveguide layer 186 and a collimated light beam propagated in the waveguide layer 186. Each of the grating couplers 188A and 188B has an optical pattern composed of parallel lines separated by equal intervals (equal pitches). The optical pattern is formed by, for example, given unevenness or roughness in the grating-coupler surface. Thus, the grating couplers 188A and 188B are of the linear type. As viewed in a plane perpendicular to an optical axis with respect to a light beam incident to the grating couplers 188A and 188B, the optical axes of the waveguide paths from the grating couplers 188A and 188B (that is, the optical axes of the grating couplers 188A and 188B with respect to the light beams in the waveguide layer 186) are approximately perpendicular to each other. In addition, the optical axes of the waveguide paths form angles of about +45° and about −45° with respect to the normal direction of the polarization of the incident light beam respectively.

The semitransparent reflection-type grating 164 has a square configuration which overlaps with the full circular configuration of the grating couplers 188A and 188B.

The waveguide layer 186 is formed with a continuous combination of waveguide lenses 190A and 190B including reflection-type lenses respectively. Each of the waveguide lenses 190A and 190B is designed to have a light condensing function (a focusing function). The waveguide lenses 190A and 190B are located in optical paths extending from the output sides of the grating couplers 188A and 188B respectively. The waveguide lenses 190A and 190B form a path-bent optical system.

Each of the waveguide lenses 190A and 190B is of a parabolic configuration for focusing a collimated light beam on a point. Each of the waveguide lenses 190A and 190B can be easily designed in a method having the step of tracing light rays in a waveguide plane. A mirror providing the waveguide lense 190A or 190B can be formed by etching a portion of a waveguide layer 186 into a taper shape. To reduce a scattering loss caused by the mirror surface, it is preferable that the angle of the taper shape with respect to the waveguide plane is set to a small angle (for example, 10°) to suppress roughness in the taper surface.

The substrate 182 is formed with photodetectors 192A and 192B each having two divided segments. The photodetectors 192A and 192B are located in optical paths extending from the output sides of the waveguide lenses 190A and 190B respectively. According to the divided-segment arrangement of the photodetectors 192A and 192B, it is possible to generate an information-representing signal, a focusing error signal, and a tracking error signal in response to the output signals of the photodetectors 192A and 192B.

The photodetectors 192A and 192B are electrically connected to a processing section 194. The processing section 194 is of a monolithic structure on the substrate 182 similarly to the photodetectors 192A and 192B. The processing section 194 has a combination of for example, current-voltage converters, signal amplifiers, and operational amplifiers. The current-voltage converters act on the output signals of the photodetectors 192A and 192B. It is preferable to simultaneously make the processing section 194 and the photodetectors 192A and 192B.

The embodiment of FIGS. 24 and 25 has an optoelectronic integrated circuit including RF amplifiers and an error-signal-generating matrix circuit in an optical disk player. It should be noted that the processing section 194 may be outside the optical integrated circuit 180.

A semiconductor laser 160 and a collimating lens 162 are successively arranged along an optical path toward a first input side of the semitransparent reflection-type grating 164. A magneto-optical disk (a recording disk) 168 and an objective lens 166 are successively arranged along an optical path toward a second input side of the semitransparent reflection-type grating 164.

The optical integrated circuit 180 can be made in a way similar to the way of the fabrication of the optical integrated circuit 124 in FIGS. 18, 19, and 20.

The optical pickup device of FIGS. 24 and 25 operates as follows. The semiconductor laser 160 emits a laser light beam having an ellipsoidal cross-section. The laser light beam emitted from the semiconductor laser 160 is incident to the collimating lens 162, and is made thereby into a collimated light beam. The collimated light beam travels from the collimating lens 162 to the semitransparent reflection-type grating 164 in the optical integrated circuit 180. The collimated light beam is reflected by the semitransparent reflection-type grating 164 at an angle of about 90° while the ellipsoidal cross-section thereof is shaped into an approximately circular cross-section by the semitransparent reflection-type grating 164.

The reflection-resultant light beam is directed from the semitransparent reflection-type grating 164 toward the objective lens 166. The reflection-resultant light beam is incident to the objective lens 166 as a forward light beam, being focused on the magneto-optical disk 168 thereby. The forward light beam is reflected by the magneto-optical disk 168, being made into a return light beam. The light beam undergoes rotation of a polarization plane due to the Kerr effect when being applied to and reflected by a magnetic recording portion 168A of the magneto-optical disk 168. The return light beam travels back from the magneto-optical disk 168, and passes through the objective lens 166. Subsequently, the return light beam reaches the semitransparent reflection-type grating 164. The return light beam passes through the semitransparent reflection-type grating 164 before being incident to the grating couplers 188A and 188B. The return light beam is introduced into the waveguide layer 186 via the grating couplers 188A and 188B, being changed and separated into light beams propagated in the waveguide layer 186 respectively.

As previously described, each of the grating couplers 188A and 188B provides a coupling (a conversion) between a collimated light beam propagated outside the waveguide layer 186 and a collimated light beam propagated in the waveguide layer 186. In addition, the optical axes of the waveguide paths from the grating couplers 188A and 188B (that is, the optical axes of the grating couplers 188A and 188B with respect to the light beams in the waveguide layer 186) form angles of about +45° and about −45° with respect to the normal direction of the polarization of the incident light beam respectively.

Therefore, in the case where only TE-mode light beams are excited in the waveguide layer 186, only components QA and QB of the incident light beam which are polarized in directions perpendicular to the optical axes of the waveguide paths from the grating couplers 188A and 188B are selected and extracted as light beams propagated in the waveguide layer 186 (see FIG. 25).

As a result, the grating couplers 188A and 188B serve as analyzers which are arranged in perpendicular directions respectively and which are related to polarization angles of about ±45° with respect to the normal direction of the polarization of the incident light beam. Therefore, the grating couplers 188A and 188B output light beams polarized in directions perpendicular to each other respectively.

The light beam outputted from the grating coupler 188A is incident to the waveguide lens 190A, being reflected and focused on the photodetector 192A thereby. The photodetector 192A converts the received light beam into a corresponding electric signal. The photodetector 192A outputs the electric signal to the processing section 194.

The light beam outputted from the grating coupler 188B is incident to the waveguide lens 190B, being reflected and focused on the photodetector 192B thereby. The photodetector 192B converts the received light beam into a corresponding electric signal. The photodetector 192B outputs the electric signal to the processing section 194.

The processing section 194 includes a first known circuit for generating a focusing error signal FE from the output signals of the photodetectors 192A and 192B. In addition, the processing section 194 includes a second known circuit for generating a tracking error signal TE from the output signals of the photodetectors 192A and 192B.

The processing section 194 also includes a differential amplifier or a subtracter which generates and outputs a signal $FR_{DEF}$ depending on the difference between the output signals of the photodetectors 192A and 192B. The signal $FR_{DEF}$ represents the rotation of the direction of the polarization of the incident light beam coming from the magneto-optical disk 168. The processing section 194 further includes a summing circuit or an adder which generates and outputs a signal $RF_{SUM}$ depending on the addition of the output signals of the photodetectors 192A and 192B. The signal $RF_{SUM}$ represents the intensity of the incident light beam coming from the magneto-optical disk 168.

As understood from the above description, the optical integrated circuit 180 of FIGS. 24 and 25 uses guided light beams in the same mode (for example, the TE mode). This fact enables easy designing of the optical integrated circuit 180 in comparison with designing of an optical integrated circuit using guided light beams of at least two different modes. In addition, this fact enables an increased accuracy of the arrangement of the optical integrated circuit 180 as well as an increased efficiency of the detection of the guided light beams.

As shown in FIGS. 24 and 25, the optical pickup device has two light detecting sections which are symmetrical with each other. Specifically, one of the two light detecting sections includes the grating coupler 188A, the waveguide lens 190A, the photodetector 192A, and the left-hand half of the waveguide layer 186. The other of the two light detecting sections includes the grating coupler 188B, the waveguide lens 190B, the photodetector 192B, and the right-hand half of the waveguide layer 186. The symmetrical configuration enables a good balance between the two light detecting sections, and also a good balance between the output electric signals of the two light detecting sections. Under the good balance, in-phase (equal-phase) noise is adequately removed from the target signal $FR_{DEF}$ through difference-generating operation of the processing section 194. Therefore, it is possible to attain a high SNR (signal-to-noise ratio) and a high CNR (carrier-to-noise ratio) with respect to the target signal $FR_{DEF}$.

As understood from the previous description, the semitransparent reflection-type grating 164, the grating couplers 188A and 188B, the waveguides (the waveguide layer 186), the waveguide lenses 190A and 190B, the photodetectors 192A and 192B, and the processing section 194 are combined into the optical integrated circuit 180. This design is advantageous in miniaturizing the optical pickup device. As previously described, the waveguide lenses 190A and 190B form the path-bent optical system which is advantageous in miniaturizing the optical integrated circuit 180.

It should be noted that the optical integrated circuit 180 except the semitransparent reflection-type grating 164, the photodetectors 192A and 192B, and the processing section 194 may be replaced by the optical integrated circuit, the photodetectors 18A and 18B, and the processing section 20 in FIGS. 4–6.

Ninth Embodiment

Figure 26:
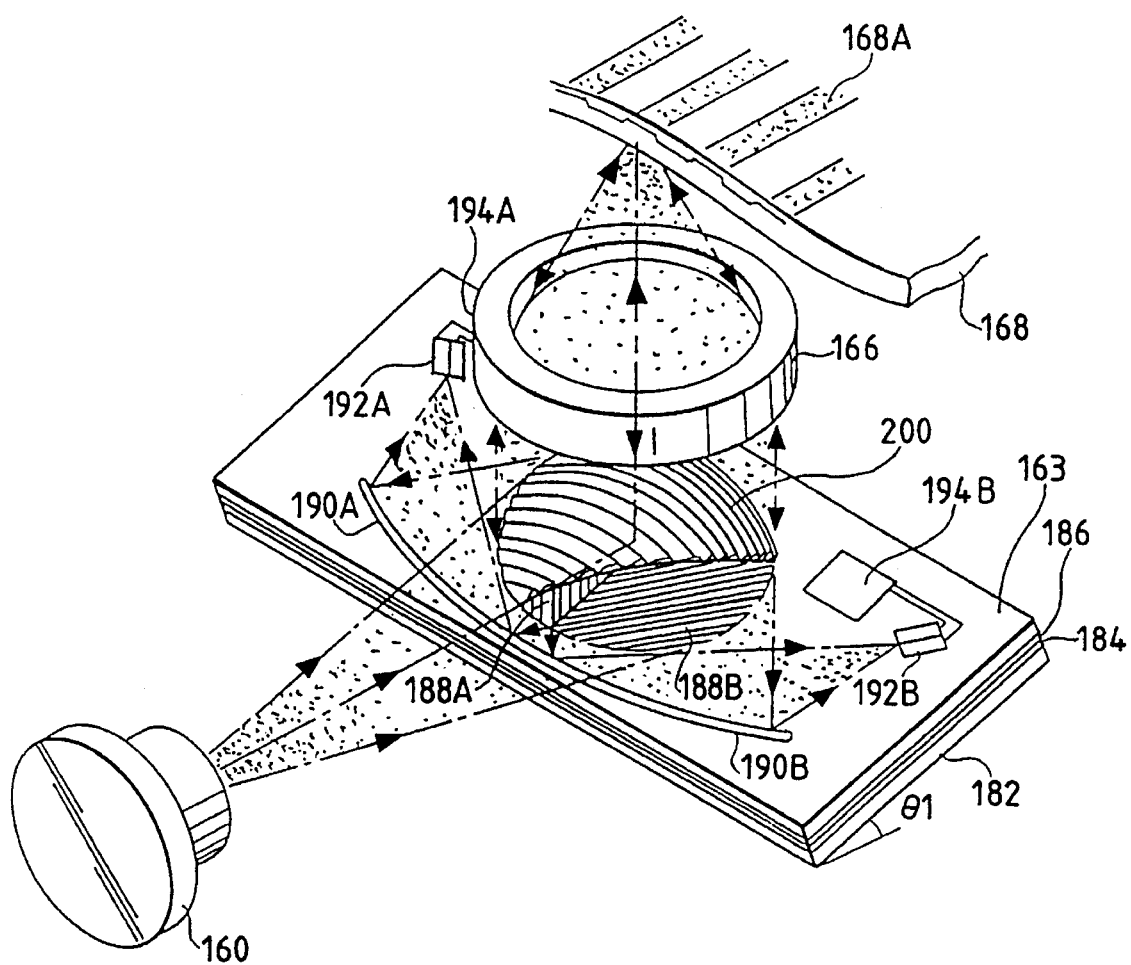
FIG. 26 is a diagram of a portion of an optical pickup device including an optical integrated circuit according to a ninth embodiment of this invention.

FIG. 26 shows a ninth embodiment of this invention which is similar to the embodiment of FIGS. 24 and 25 except for design changes indicated hereinafter. The embodiment of FIG. 26 uses a semitransparent reflection-type hologram 200 instead of the semitransparent reflection-type grating 164 (see FIGS. 24 and 25). The semitransparent reflection-type hologram 200 has a given optical pattern for wavefront conversion which implements change of a diverging light beam into an approximately collimated light beam.

The embodiment of FIG. 26 includes processing sections 194A and 194B electrically connected to photodetectors 192A and 192B respectively. It should be noted that the processing section 194A is not shown in FIG. 26.

The embodiment of FIG. 26 operates as follows. A semiconductor laser 160 emits a diverging laser light beam having an ellipsoidal cross-section. The laser light beam emitted from the semiconductor laser 160 is incident to the semitransparent reflection-type hologram 200. The path of the laser light beam is changed by the semitransparent reflection-type hologram 200 at an angle of about 90°, and the path-change resultant light beam is directed toward an objective lens 166 as a forward light beam. The semitransparent reflection-type hologram 200 has also the function of shaping the ellipsoidal cross-section of the laser light beam into an approximately circular cross-section. In addition, the semitransparent reflection-type hologram 200 has the function of making the diverging light beam into a collimated light beam.

The forward light beam travels from the semitransparent reflection-type hologram 200 to the objective lens 166, and then passes through the objective lens 166. The forward light beam is focused by the objective lens 166 on a magneto-optical disk 168.

The forward light beam is reflected by the magneto-optical disk 168. The reflection-resultant light beam agrees with a return light beam which moves back from the magneto-optical disk 168. The return light beam passes through the objective lens 166, and then reaches the semitransparent reflection-type hologram 200. Subsequently, the return light beam passes through the semitransparent reflection-type hologram 200 before being incident to grating couplers 188A and 188B. The return light beam is introduced into a waveguide layer 186 via the grating couplers 188A and 188B, being changed and separated into light beams propagated in the waveguide layer 186 respectively.

The light beam outputted from the grating coupler 188A is incident to a waveguide lens 190A, being reflected and focused on the photodetector 192A thereby. The photodetector 192A converts the received light beam into a corresponding electric signal. The photodetector 192A outputs the electric signal to the processing section 194A. The output signal of the photodetector 192A is converted by the processing section 194A into a desired signal or desired signals.

The light beam outputted from the grating coupler 188B is incident to a waveguide lens 190B, being reflected and focused on the photodetector 192B thereby. The photodetector 192B converts the received light beam into a corresponding electric signal. The photodetector 192B outputs the electric signal to the processing section 194B. The output signal of the photodetector 192B is converted by the processing section 194B into a desired signal or desired signals.

Tenth Embodiment

Figure 27:
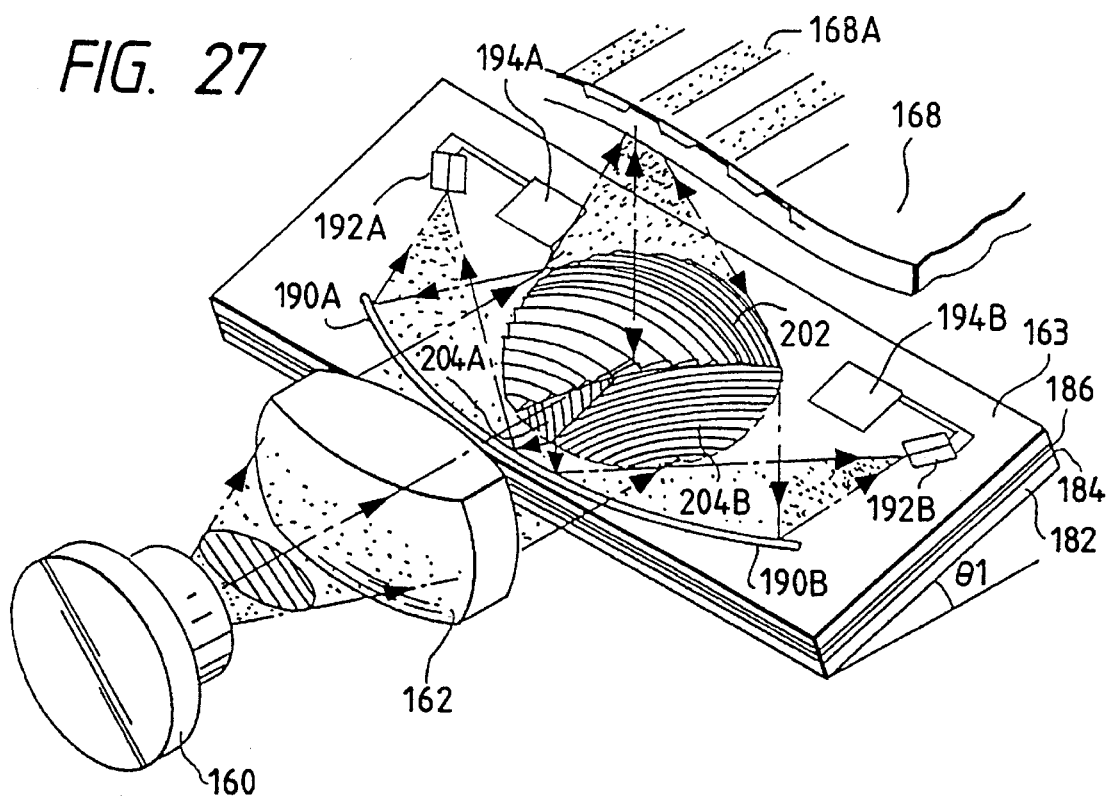
FIG. 27 is a diagram of a portion of an optical pickup device including an optical integrated circuit according to a tenth embodiment of this invention.

FIG. 27 shows a tenth embodiment of this invention which is similar to the embodiment of FIGS. 24 and 25 except for design changes indicated hereinafter. The embodiment of FIG. 27 uses a semitransparent reflection-type hologram 202 instead of the semitransparent reflection-type grating 164 and the objective lens 166 (see FIGS. 24 and 25). In addition, the embodiment of FIG. 27 uses focusing grating couplers 204A and 204B instead of the grating couplers 188A and 188B (see FIGS. 24 and 25). Furthermore, the embodiment of FIG. 27 includes processing sections 194A and 194B electrically connected to photodetectors 192A and 192B respectively.

The semitransparent reflection-type hologram 202 has a given optical pattern for wavefront conversion which implements change of a collimated light beam into a converging light beam, and which implements shaping an ellipsoidal-section light beam into a circular-section light beam.

The embodiment of FIG. 27 operates as follows. A semiconductor laser 160 emits a diverging laser light beam having an ellipsoidal cross-section. The laser light beam emitted from the semiconductor laser 160 is incident to a collimating lens 162, being made into a collimated light beam thereby. The collimated light beam travels from the collimating lens 162 to the semitransparent reflection-type hologram 202. The path of the laser light beam is changed by the semitransparent reflection-type hologram 202 at an angle of about 90°, and the path-change resultant light beam is directed toward a magneto-optical disk 168 as a forward light beam. The cross section of the light beam is shaped into approximately a circle by the semitransparent reflection-type hologram 202. The forward light beam is focused by the semitransparent reflection-type hologram 202 on the magneto-optical disk 168.

The forward light beam is reflected by the magneto-optical disk 168. The reflection-resultant light beam agrees with a return light beam which moves back from the magneto-optical disk 168. The return light beam is incident to the semitransparent reflection-type hologram 202. Subsequently, the return light beam passes through the semitransparent reflection-type hologram 202 before being incident to the grating couplers 204A and 204B. The return light beam is introduced into a waveguide layer 186 via the grating couplers 204A and 204B, being changed and separated into light beams propagated in the waveguide layer 186 respectively.

The light beam outputted from the grating coupler 204A is incident to a waveguide lens 190A, being reflected and focused on the photodetector 192A thereby. The photodetector 192A converts the received light beam into a corresponding electric signal. The photodetector 192A outputs the electric signal to the processing section 194A. The output signal of the photodetector 192A is converted by the processing section 194A into a desired signal or desired signals.

The light beam outputted from the grating coupler 204B is incident to a waveguide lens 190B, being reflected and focused on the photodetector 192B thereby. The photodetector 192B converts the received light beam into a corresponding electric signal. The photodetector 192B outputs the electric signal to the processing section 194B. The output signal of the photodetector 192B is convened by the processing section 194B into a desired signal or desired signals.

Eleventh Embodiment

Figure 28:
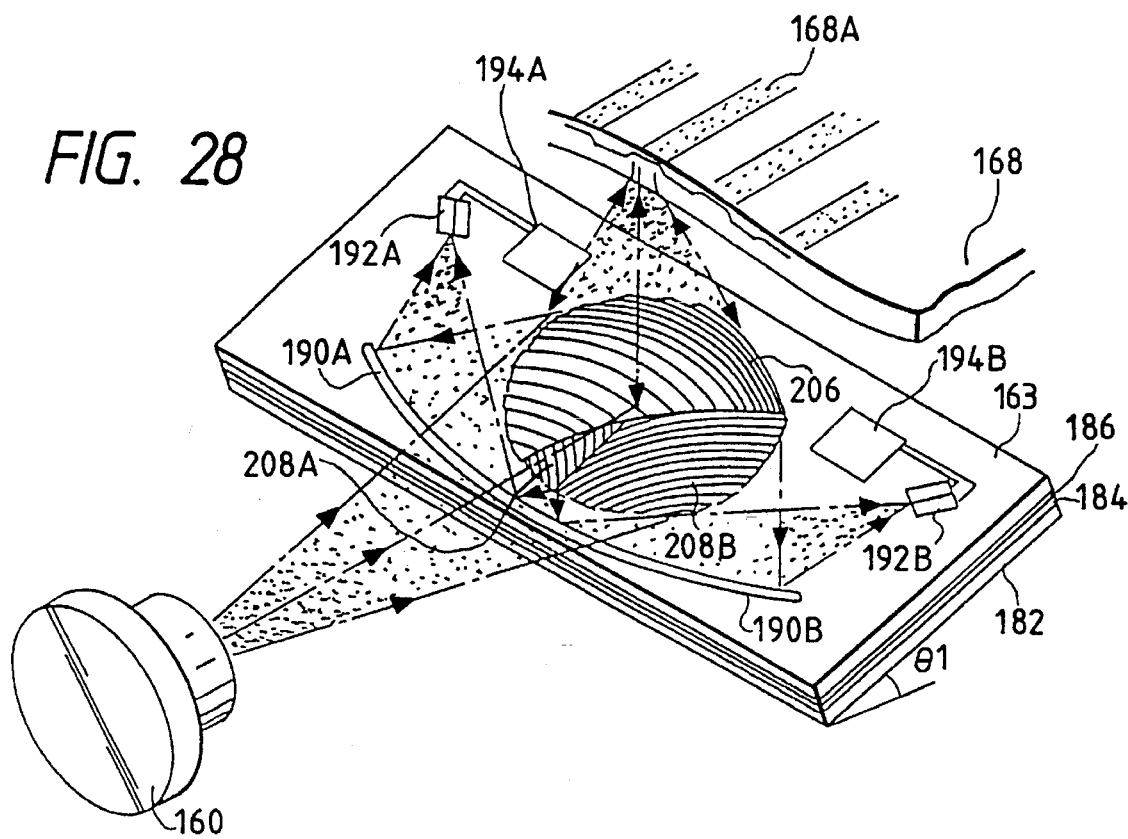
FIG. 28 is a diagram of a portion of an optical pickup device including an optical integrated circuit according to an eleventh embodiment of this invention.

FIG. 28 shows an eleventh embodiment of this invention which is similar to the embodiment of FIGS. 24 and 25 except for design changes indicated hereinafter. The embodiment of FIG. 28 uses a semitransparent reflection-type hologram 206 instead of the collimating lens 162, the semitransparent reflection-type grating 164, and the objective lens 166 (see FIGS. 24 and 25). In addition, the embodiment of FIG. 28 uses focusing grating couplers 208A and 208B instead of the grating couplers 188A and 188B (see FIGS. 24 and 25). Furthermore, the embodiment of FIG. 28 includes processing sections 194A and 194B electrically connected to photodetectors 192A and 192B respectively.

The semitransparent reflection-type hologram 206 has a given optical pattern for wavefront conversion which implements change of a diverging light beam into a converging light beam, and which implements shaping an ellipsoidal-section light beam into a circular-section light beam.

The embodiment of FIG. 28 operates as follows. A semiconductor laser 160 emits a diverging laser light beam having an ellipsoidal cross-section. The laser light beam emitted from the semiconductor laser 160 is incident to the semitransparent reflection-type hologram 206. The path of the laser light beam is changed by the semitransparent reflection-type hologram 206 at an angle of about 90°, and the path-change resultant light beam is directed toward a magneto-optical disk 168 as a forward light beam. The cross section of the light beam is shaped into approximately a circle by the semitransparent reflection-type hologram 206. The forward light beam is focused by the semitransparent reflection-type hologram 206 on the magneto-optical disk 168.

The forward light beam is reflected by the magneto-optical disk 168. The reflection-resultant light beam agrees with a return light beam which moves back from the magneto-optical disk 168. The return light beam is incident to the semitransparent reflection-type hologram 206. Subsequently, the return light beam passes through the semitransparent reflection-type hologram 206 before being incident to the grating couplers 208A and 208B. The return light beam is introduced into a waveguide layer 186 via the grating couplers 208A and 208B, being changed and separated into light beams propagated in the waveguide layer 186 respectively.

The light beam outputted from the grating coupler 208A is incident to a waveguide lens 190A, being reflected and focused on the photodetector 192A thereby. The photodetector 192A converts the received light beam into a corresponding electric signal. The photodetector 192A outputs the electric signal to the processing section 194A. The output signal of the photodetector 192A is converted by the processing section 194A into a desired signal or desired signals.

The light beam outputted from the grating coupler 208B is incident to a waveguide lens 190B, being reflected and focused on the photodetector 192B thereby. The photodetector 192B converts the received light beam into a corresponding electric signal. The photodetector 192B outputs the electric signal to the processing section 194B. The output signal of the photodetector 192B is converted by the processing section 194B into a desired signal or desired signals.

Twelfth Embodiment

Figure 29:
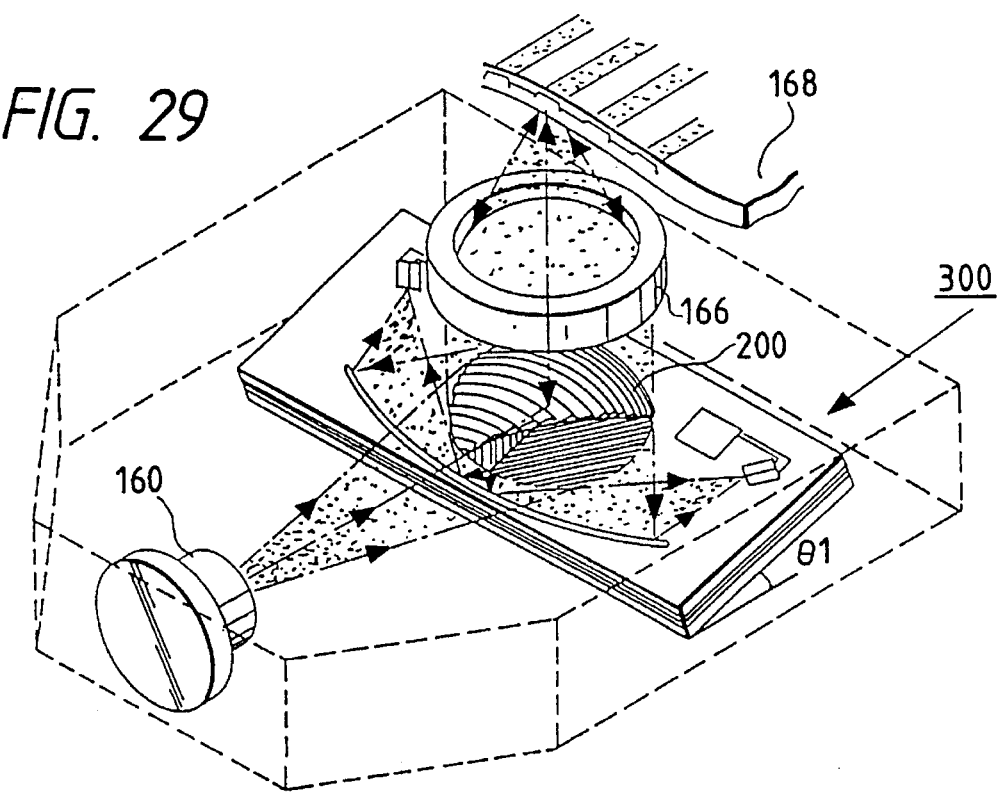
FIG. 29 is a diagram of an optical pickup device according to a twelfth embodiment of this invention.

With reference to FIG. 29, an optical pickup device includes an optical integrated circuit 300, a semiconductor laser 160, and an objective lens 166 which are mechanically combined into a single unit connected to an actuator (not shown). Therefore, the optical integrated circuit 300, the semiconductor laser 160, and the objective lens 166 can be driven and moved together by the actuator. The optical integrated circuit 300 agrees with the optical integrated circuit in FIG. 26.

Thirteenth Embodiment

Figure 30:
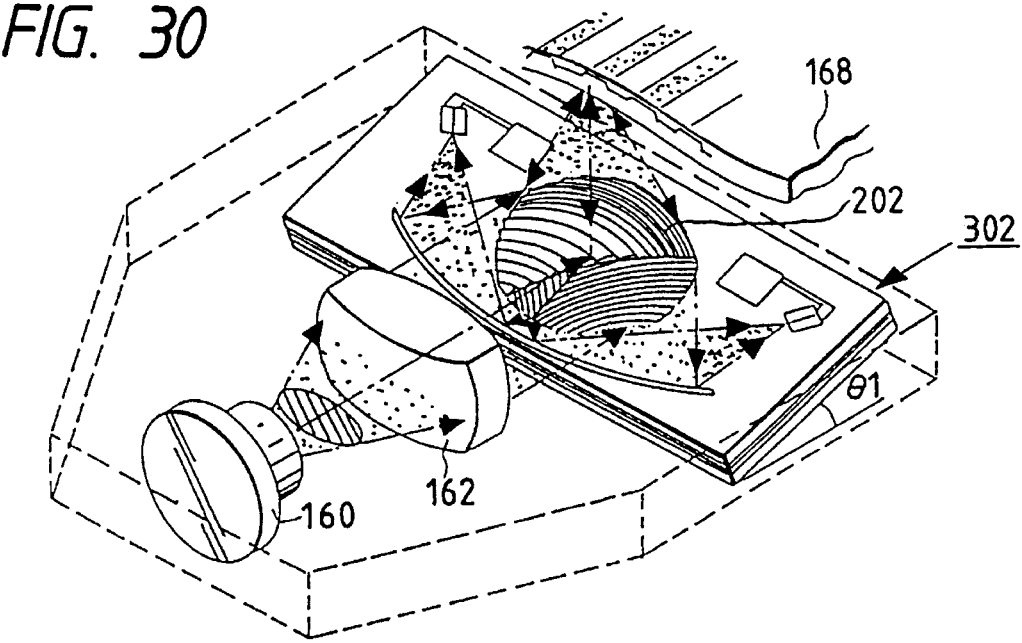
FIG. 30 is a diagram of an optical pickup device according to a thirteenth embodiment of this invention.

With reference to FIG. 30, an optical pickup device includes an optical integrated circuit 302, a semiconductor laser 160, and a collimating lens 162 which are mechanically combined into a single unit connected to an actuator (not shown). Therefore, the optical integrated circuit 302, the semiconductor laser 160, and the collimating lens 162 can be driven and moved together by the actuator. The optical integrated circuit 302 agrees with the optical integrated circuit in FIG. 27.

Fourteenth Embodiment

Figure 31:
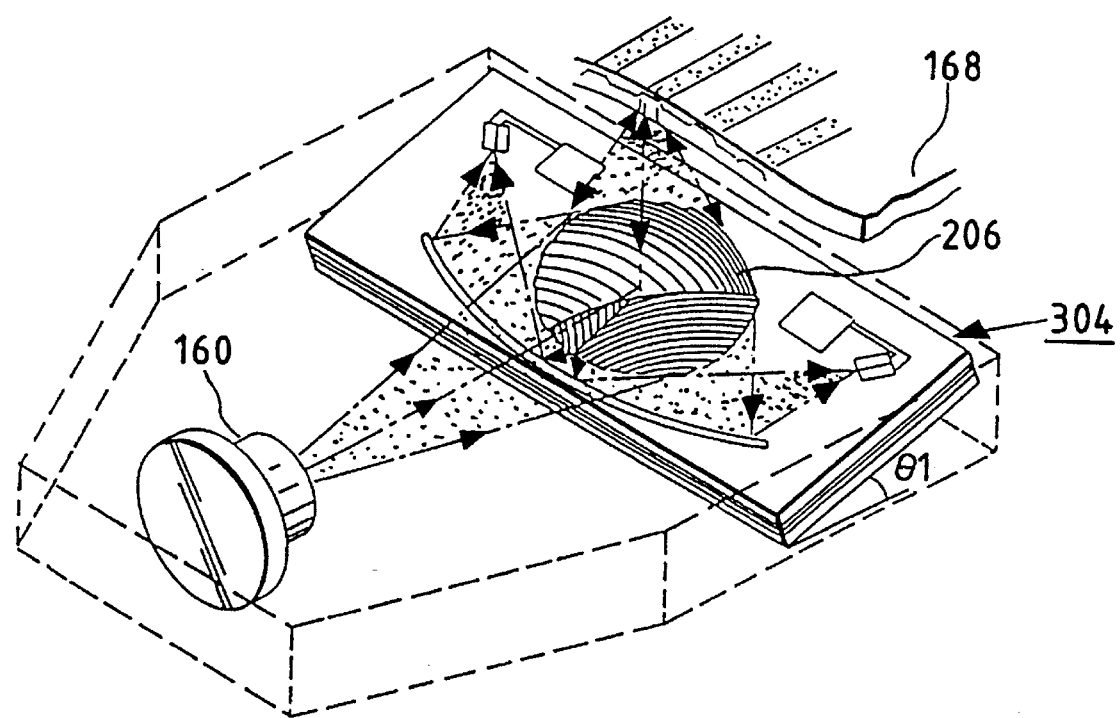
FIG. 31 is a diagram of an optical pickup device according to a fourteenth embodiment of this invention.

With reference to FIG. 31, an optical pickup device includes an optical integrated circuit 304 and a semiconductor laser 160 which are mechanically combined Into a single unit connected to an actuator (not shown). Therefore, the optical integrated circuit 304 and the semiconductor laser 160 can be driven and moved together by the actuator. The optical integrated circuit 304 agrees with the optical integrated circuit In FIG. 28.

What is claimed is:

1. An optical integrated circuit comprising:
   a substrate;
   a thin film formed on the substrate;
   a waveguide formed by the thin film;
   a grating coupler including a plurality of coupling regions for introducing an incident light beam into the waveguide, and for selecting from the incident light beam components which are perpendicularly polarized to each other and providing output light beams, wherein the output light beams are in a same waveguide mode and have polarization directions perpendicular to each other respectively; and
   photodetectors exposed to the output light beams for detecting the output light beams respectively;
   wherein the output light beams are propagated to respective photodetectors in respective propagation directions in the waveguide, said respective propagation directions being different from each other.

2. The optical integrated circuit of claim 1, further comprising at least one optical element disposed in each of optical paths between the coupling regions of the grating coupler and the photodetectors.

3. The optical integrated circuit of claim 1, wherein the photodetectors are integrated on the substrate.

4. The optical integrated circuit of claim 1, further comprising a processing section for processing output signals of the photodetectors into a signal representing rotation of polarization of the incident light beam.

5. The optical integrated circuit of claim 4, wherein the processing section is integrated on the substrate.

6. The optical integrated circuit of claim 1, further comprising a buffer layer formed on the grating coupler, and a semitransparent mirror layer formed on the buffer layer.

7. An optical integrated circuit located between a light source and a recording medium along an optical path, the optical integrated circuit comprising:
   a substrate;
   a thin film formed on the substrate;
   a waveguide formed by the thin film;
   a semitransparent reflection-type grating for shaping a light beam from the light source into a forward light beam, for directing the forward light beam toward the recording medium, and for transmitting a return light beam coming from the recording medium;
   a grating coupler including a plurality of coupling regions exposed to the return light beam which has been transmitted by the semitransparent reflection-type grating for introducing the return light beam into the waveguide, and for separating the return light beam into output light beams; and
   photodetectors exposed to the output light beams for detecting the output light beams respectively;
   wherein the output light beams are propagated to respective photodetectors in respective propagation directions in the waveguide, said respective propagation directions being substantially perpendicular to each other.

8. An optical integrated circuit located between a light source and a recording medium along an optical path, the optical integrated circuit comprising:
   a substrate;
   a thin film formed on the substrate;
   a waveguide formed by the thin film;
   a semitransparent reflection-type grating for shaping a light beam from the light source into a forward light beam, for directing the forward light beam toward the recording medium, and for transmitting a return light beam coming from the recording medium;
   a grating coupler including a plurality of coupling regions exposed to the return light beam which has been transmitted by the semitransparent reflection-type grating for introducing the return light beam into the waveguide, and for separating the return light beam into output light beams; and
   photodetectors exposed to the output light beams for detecting the output light beams respectively;
   wherein the output light beams are propagated to respective photodetectors in respective propagation directions in the waveguide, said respective propagation directions being substantially perpendicular to each other,
   wherein the output light beams are in a same waveguide mode and have polarization directions perpendicular to each other respectively.

9. The optical integrated circuit of claim 8, wherein the photodetectors are integrated on the substrate.

10. The optical integrated circuit of claim 9, further comprising a processing section for processing output signals of the photodetectors into a signal representing rotation of polarization of the return light beam, the processing section being integrated on the substrate.

11. An optical integrated circuit located between a light source and a recording medium along an optical path, the optical integrated circuit comprising:
    a substrate;
    a thin film formed on the substrate;
    a waveguide formed by the thin film;
    a semitransparent reflection-type hologram for shaping and wavefront-converting a light beam from the light source into a forward light beam, for directing the forward light beam toward the recording medium, and for transmitting a return light beam coming from the recording medium;
    a grating coupler including a plurality of coupling regions exposed to the return light beam which has been transmitted by the semitransparent reflection-type hologram for introducing the return light beam into the waveguide, and for separating the return light beam into output light beams; and
    photodetectors exposed to the output light beams for detecting the output light beams respectively;
    wherein the output light beams are propagated to respective photodetectors in respective propagation directions in the waveguide, said respective propagation directions being different from each other, and
    wherein the output light beams have polarization directions perpendicular to each other respectively.

12. The optical integrated circuit of claim 11, wherein the output light beams are in a same waveguide mode.

13. The optical integrated circuit of claim 11, wherein the photodetectors are integrated on the substrate.

14. The optical integrated circuit of claim 13, further comprising a processing section for processing output signals of the photodetectors into a signal representing rotation of polarization of the return light beam, the processing section being integrated on the substrate.

15. An optical pickup device for a recording medium, comprising:

a) a light source emitting a light beam;

b) an optical integrated circuit deriving a forward light beam from the light beam emitted from the light source, the optical integrated circuit being exposed to a return light beam coming from the recording medium; and c) means for focusing the forward light beam on the recording medium;

wherein the light source, the optical integrated circuit, and the focusing means are mechanically combined into a single unit;

the optical integrated circuit comprising:

b1) a substrate;

b2) a thin film formed on the substrate;

b3) a waveguide formed by the thin film;

b4) a semitransparent reflection-type hologram for shaping and wavefront-converting the light beam from the light source into the forward light beam, for directing the forward light beam toward the recording medium, and for transmitting the return light beam coming from the recording medium;

b5) a grating coupler including a plurality of coupling regions exposed to the return light beam which has been transmitted by the semitransparent reflection-type hologram for introducing the return light beam into the waveguide, and for separating the return light beam into output light beams; and b6) photodetectors exposed to the output light beams detecting the output light beams respectively;

wherein the output light beams are propagated to respective photodetectors in respective propagation directions in the waveguide, said respective propagation directions being different from each other, and wherein the output light beams have polarization directions perpendicular to each other respectively.

16. The optical pickup device of claim 15, wherein the output light beams are in a same waveguide mode.

17. The optical pickup device of claim 15, wherein the photodetectors are integrated on the substrate.

18. The optical pickup device of claim 17, wherein the optical integrated circuit further comprises a processing section for processing output signals of the photodetectors into a signal representing rotation of polarization of the return light beam, the processing section being integrated on the substrate.

19. The optical pickup device of claim 15, wherein the focusing means is incorporated into the optical integrated circuit.

* * * * *